US007769920B2

(12) United States Patent
Kimura et al.

(10) Patent No.: US 7,769,920 B2
(45) Date of Patent: Aug. 3, 2010

(54) INFORMATION PROCESSING APPARATUS, INFORMATION PROCESSING METHOD, AND PROGRAM AND RECORDING MEDIUM USED THEREWITH

(75) Inventors: Shin Kimura, Kanagawa (JP); Kazuhisa Tsuchiya, Kanagawa (JP); Nobuhiro Sakai, Kanagawa (JP); Kazuhiko Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1042 days.

(21) Appl. No.: 11/105,650

(22) Filed: Apr. 13, 2005

(65) Prior Publication Data

US 2005/0232589 A1    Oct. 20, 2005

(30) Foreign Application Priority Data

Apr. 15, 2004  (JP) .................... P2004-119851

(51) Int. Cl.
G06F 3/00 (2006.01)
G06F 5/00 (2006.01)

(52) U.S. Cl. .................... 710/36; 707/822; 707/831; 710/1; 719/319

(58) Field of Classification Search .................... 707/1, 707/9, 100–104.1; 710/1, 36, 50; 711/1, 711/6; 719/319
See application file for complete search history.

(56) References Cited

U.S. PATENT DOCUMENTS 5,463,772 A   10/1995  Thompson et al.
5,961,582 A * 10/1999  Gaines ........................ 718/1
7,266,538 B1 *  9/2007  Shatil ........................ 707/1
2003/0225735 A1* 12/2003  Weber ........................ 707/1

FOREIGN PATENT DOCUMENTS

| EP | 1 357 554 | 10/2003 |
| JP | 2 5150 | 1/1990 |
| JP | 2000 148651 | 5/2000 |
| JP | 2000 259432 | 9/2000 |
| JP | 2002 175286 | 6/2002 |
| JP | 2002 268924 | 9/2002 |
| JP | 2004 30254 | 1/2004 |
| WO | WO 01 75566 | 10/2001 |

OTHER PUBLICATIONS

William Stallings; Operating Systems Internals and Design Principles; 2000; Prentice Hall; Fourth Edition; p. 290.*
Ron White; How Computers Work; 2002; Que Corporation; 6th Edition; pp. 136-137.*
William Stallings; Operating Systems Internals and Design Principles; 2001; Prentice Hall; Fourth Edition; pp. 526-531.*

* cited by examiner

Primary Examiner—Alford W Kindred
Assistant Examiner—Richard Franklin
(74) Attorney, Agent, or Firm—Frommer, Lawrence & Haug LLP; William S. Frommer; Thomas F. Presson

(57) ABSTRACT

An information processing apparatus is connected to a recording or playback apparatus having a file system. The information processing apparatus includes a receiver for receiving a command provided by an operating system in response to a file operating request from an application, and a converter for converting the command provided by the operating system into a request which is to be converted into a command based on a communication protocol capable of handling the file system in communication with said recording or playback apparatus.

9 Claims, 16 Drawing Sheets

FIG. 10

| FILE OPEN | This command designates a file name and a File Open Mode, and opens the file. This command also sends back a File Handle. |
|---|---|
| FILE CLOSE | This command closes a file designated by a File Handle. |
| FILE READ | This command designates a File Handle obtained with a FILE OPEN Command and reads File Stream data by a Read Size designated. |
| FILE WRITE | This command designates a File Handle obtained with a FILE OPEN Command and writes File Stream data by a Write Size designated. |
| FILE LOGICAL SEEK | This command designates a File Handle obtained with a FILE OPEN Command and changes a Current File Pointer to a designated value. |
| SET EOF | This command designates a File Handle obtained with a FILE OPEN Command and changes an EOF to the position of a Current File Pointer. |
| DELETE | This command deletes a file designated by using a file name. |
| RENAME | This command designates a file (or directory) name before it is changed and a changed file (or directory) name, and changes the file (or directory) name before it is changed. |
| MAKE DIRECTORY | This command creates a directory having a directory name designated. |
| REMOVE DIRECTORY | This command deletes a directory having a directory name designated. |
| LIST OPEN | This command sends back a Handle for obtaining a File List having a file or directory name designated and File Meta information. |
| LIST READ | This commands designates a Handle obtained by using a LIST OPEN and read a File List and File Meta information. |
| FORMAT | This command forms a disc. |
| EJECT | This command ejects a disc. |
| DISC INFO | This command acquires Disc information (such as a disc free storage area). |
| SYSTEM | This command acquires disc drive system information. |
| SETUP | This command enables reception of a "PD-SBP2" command. |

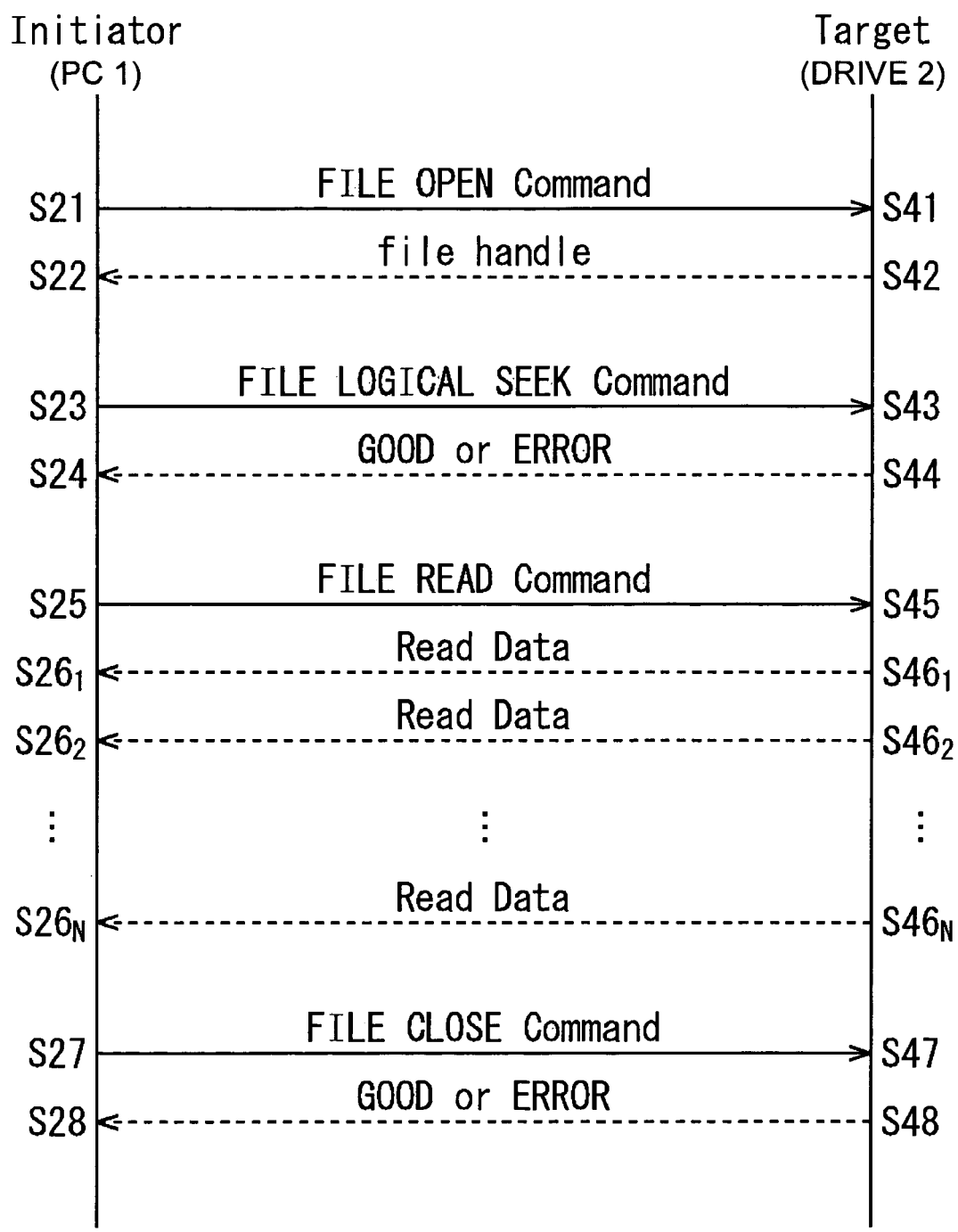

FIG. 13

| IOCTL_PD_FILE_OPEN | An IOCTL code corresponding to "PD-SBP2 Protocol" FILE OPEN Command |
|---|---|
| IOCTL_PD_FILE_CLOSE | An IOCTL code corresponding to "PD-SBP2 Protocol" FILE CLOSE Command. |
| IOCTL_PD_FILE_READ | An IOCTL code corresponding to "PD-SBP2 Protocol" FILE READ Command |
| IOCTL_PD_FILE_WRITE | An IOCTL code corresponding to "PD-SBP2 Protocol" FILE WRITE Command. |
| IOCTL_PD_LOGICAL_SEEK | An IOCTL code corresponding to "PD-SBP2 Protocol" FILE LOGICAL SEEK Command |
| IOCTL_PD_SET_EOF | An IOCTL code corresponding to "PD-SBP2 Protocol" FILE EOF Command. |
| IOCTL_PD_DELETE | An IOCTL code corresponding to "PD-SBP2 Protocol" FILE DELETE Command |
| IOCTL_PD_RENAME | An IOCTL code corresponding to "PD-SBP2 Protocol" RENAME Command. |
| IOCTL_PD_MAKE_DIRECTORY | An IOCTL code corresponding to "PD-SBP2 Protocol" MAKE DIRECTORY Command |
| IOCTL_PD_REMOVE_DIRECTORY | An IOCTL code corresponding to "PD-SBP2 Protocol" REMOVE DIRECTORY Command. |
| IOCTL_PD_LIST_OPEN | An IOCTL code corresponding to "PD-SBP2 Protocol" FILE LIST OPEN Command. |
| IOCTL_PD_LIST_READ | An IOCTL code corresponding to "PD-SBP2 Protocol" FILE LIST READ Command. |
| IOCTL_PD_FORMAT | An IOCTL code corresponding to "PD-SBP2 Protocol" FORMAT Command. |
| IOCTL_PD_EJECT | An IOCTL code corresponding to "PD-SBP2 Protocol" EJECT Command. |
| IOCTL_PD_DISK_INFO | An IOCTL code corresponding to "PD-SBP2 Protocol" DISC INFO Command. |
| IOCTL_PD_SYSTEM | An IOCTL code corresponding to "PD-SBP2 Protocol" SYSTEM Command. |

INFORMATION PROCESSING APPARATUS, INFORMATION PROCESSING METHOD, AND PROGRAM AND RECORDING MEDIUM USED THEREWITH

CROSS REFERENCES TO RELATED APPLICATIONS

The present invention contains subject matter related to Japanese Patent Application JP 2004-119851 filed in the Japanese Patent Office on Apr. 15, 2004, the entire contents of which are incorporated herein by reference.

BACKGROUND OF THE INVENTION

1. Field of the Invention

The present invention relates to information processing apparatuses, information processing methods, and programs and recording media used therewith. In particular, the present invention relates to an information processing apparatus and information processing method for easily handling, by using a general purpose computer, a recording or playback apparatus, such as a disk drive having a file system therein, and to a program and recording medium used therewith.

2. Description of the Related Art

In recent years, it has been requested that recording and playback of high bit rate audiovisual (AV) data on, for example, an optical disc, be performed.

Accordingly, the assignee of the present invention has already proposed a disc drive (see, for example, Japanese Unexamined Patent Application Publication No. 2004-005895) that periodically records a plurality of data series, such as video data and audio data associated therewith, on an optical disc so that their boundaries coincide with boundaries, such as sectors, of the optical disc.

According to this disc drive, the video data and the audio data are recorded, to some extent, collectively in consecutive recording areas on the optical disc. Thus, the collective data can be read and recorded without seeking.

In addition, a boundary between video data and audio data coincides with a boundary between sectors on the optical disc. Thus, one sector does not have any mixture of video data and audio data. Accordingly, for example, only the video data or only the audio data can be read. In other words, for example, when only the video data is needed, only the video data can be read from the optical disc. Compared with a case in which one sector has a mixture of video data and audio data, only the video data can be read more efficiency (at high speed). This also applies to the audio data.

SUMMARY OF THE INVENTION

The assignee of the present invention also has proposed a disc drive in which, among consecutive free areas, having a predetermined size or greater, in the recording areas of the optical disc, for example, a free area closest to a recording area with data recorded therein in the closest past is reserved and data is recorded in the reserved recording area.

In this case, ideally, a string of data is recorded in consecutive recording areas on the optical disc in a so-called "unicursal" form. Therefore, in a data recording or playback mode, the occurrence of a seek can be suppressed, high bit rate AV data can be recorded on the optical disc in real time, and high bit rate AV data from the optical disc can be played back in real time.

In this specification, a disc drive that reduces a seek occurring in a data recording or playback mode by reserving, among consecutive free areas, having a predetermined size or greater, in the recording areas of the optical disc, a free area closest to a recording area with data recorded therein in the closest past, and recording data in the reserved area is hereinafter referred to as a "professional disc drive", if necessary.

An optical disc having data recorded thereon by the professional disc drive is hereinafter referred to as a "professional disc", if necessary. The professional disc is also hereinafter abbreviated to the "PD", if necessary. In addition, recording of such data as is recorded in consecutive recording areas on the optical disc in unicursal form is hereinafter referred to as so-called "unicursal recording", if necessary.

The PD drive employs, for example, the Universal Disk Format as a file system, and controls recording so that unicursal recording of AV data is performed in UDF form. In addition, the PD drive performs file allocation management, defect processing for defects on the PD, free area management, etc.

The file system of the PD drive has functions of controlling unicursal recording, and performing file allocation management, defect processing, free space management, etc., as described above. A portion of the file system that performs the functions is hereinafter referred to as a "PD allocation manager", if necessary.

Recently, with increased speed of central processing units, reduced prices of mass memories, etc., sophisticated and inexpensive computers have become realized. In these computers, applications (programs) (hereinafter referred to as "AV applications", if necessary) that perform editing of large volumes of AV data and other types of processing have also become realized.

Reading and recording of AV data on a PD by connecting a PD drive to a computer in, for example, a built-in or externally-connected form and accessing of the PD drive by an AV application are increasingly requested.

In order for an AV application of a computer to record or play back AV data on (a PD in) a PD drive, the PD drive needs to be mounted on an operating system (OS) installed in the computer.

Regarding mounting of the PD drive, there are methods for mounting the PD drive by using, for example, general purpose file systems, which are provided by the OS installed in the computer, such as the UDF file system, the New Technology File System (NTFS), and the File Allocation Table (FAT) file system.

However, in the case of mounting the PD drive by using a general purpose file system provided by the OS, unicursal recording control, etc., is not performed in the PD drive. Consequently, reading and recording of AV data are not guaranteed. In other words, when unicursal recording control is not performed, items of AV data are recorded at discrete positions in a so-called "hashed state". This results in the frequent occurrence of a seek, thus makes it difficult to read and record high bit rate AV data in real time.

In addition, when, as described above, the UDF file system is employed as an internal file system of the PD drive, if the PD drive is mounted on the computer by using a UDF driver, a UDF file in the PD drive is detectable by the application on the computer in an unprocessed form.

Accordingly, when AV data files on the PD have, for example, an MXF (Material exchange Format) OP-Atom form, AV data of the same content is separated into video data and audio data files, and the audio data is divided into different files in units of channels, AV data of certain content is detected as a video data file and audio data files in units of channels by the application on the computer, so that it is inconvenient to handle these files.

As described above, the internal file system of the PD drive has a PD allocation manager for controlling unicursal recording and performing file allocation management, defect processing, free area management, etc. Therefore, if the file system of the PD drive is directly used, the PD drive can be easily handled by (the application of) the computer.

The present invention has been made in view of the above circumstances. It is desirable to enable facilitated handling of a recording or playback apparatus, such as a disc drive, which has an internal file system.

According to an embodiment of the present invention, there is provided an information processing apparatus includes a converting means for converting a command provided by an operating system into a request which is to be converted into a command based on a communication protocol capable of handling a file system in communication with a recording or playback apparatus.

When recording or playback apparatus uses only one file handle, the information processing apparatus may further include an exclusive controller for exclusively controls accessing of the one file handle.

The information processing apparatus may be a file system driver which does not perform file management performed by the recording or playback apparatus.

Data which is read from or recorded in a file in the recording or playback apparatus may include at least audiovisual data.

In the recording or playback apparatus, among consecutive free areas, having a predetermined size or greater, in recording areas of a recording medium, a free area having data recorded in the closest past may be reserved and data may be recorded in the reserved area.

According to an embodiment of the present invention, there is provided an information processing method including the step of converting a command provided by the operating system into a request which is to be converted into a command based on a communication protocol capable of handling a file system in communication with a recording or playback apparatus.

According to an embodiment of the present invention, there is provided a program including the step of converting a command provided by the operating system into a request which is to be converted into a command based on a communication protocol capable of handling a file system in communication with a recording or playback apparatus.

According to an embodiment of the present invention, there is provided a recording medium containing a program including the step of converting a command provided by the operating system into a request which is to be converted into a command based on a communication protocol capable of handling a file system in communication with a recording or playback apparatus.

BRIEF DESCRIPTION OF THE DRAWINGS

FIG. 10 is an illustration of extended commands;

FIG. 11 is a flowchart illustrating a file reading sequence based on PD-SBP2;

FIG. 13 is an illustration of user-defined packets IOCTL;

DESCRIPTION OF THE PREFERRED EMBODIMENTS

Embodiments of the present invention are described below with reference to the accompanying drawings.

Figure 1:
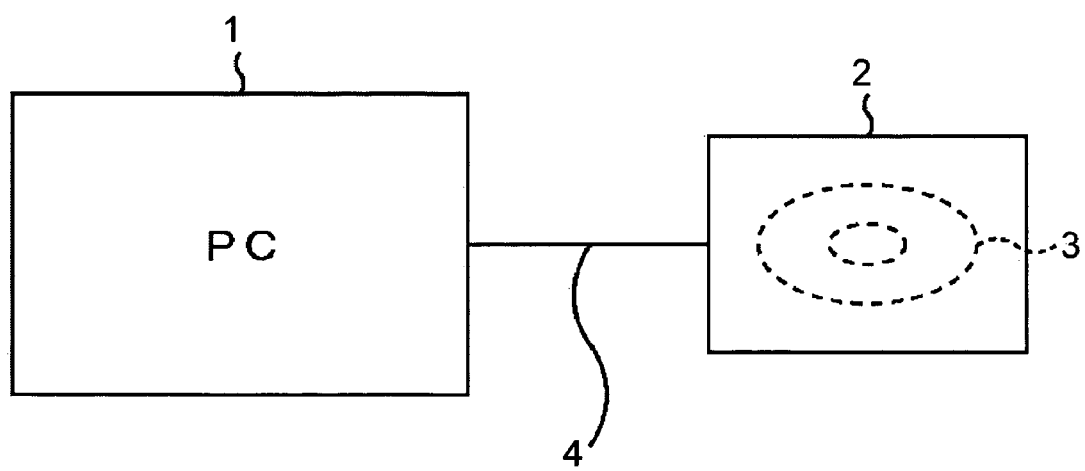
FIG. 1 is a block diagram showing an example of the configuration of an information processing system to which an embodiment of the present invention is applied.

FIG. 1 shows an example of the configuration of an information processing system to which an embodiment of the present invention is applied.

As shown in FIG. 1, the information processing system includes a personal computer (PC) 1 and a drive 2.

The PC 1 stores an operation system (OS) and applications (programs), and performs various types of processing by executing the applications under the control of the OS.

The driver 2 is, for example, the above-described PD drive, and is connected to the PC 1 by an IEEE (Institute of Electronic and Electronics Engineers) 1394 cable 4. In the drive 2, an optical disc 3, which is a PD, can be loaded and unloaded. The drive 2 reads and records AV data and other types of data on the optical disc 3 by communicating with the PC 1 in accordance with the IEEE 1394 standard.

The drive 2 does not need to be a PD drive, and the optical disc 3 does not need to be a PD. In addition, the PC 1 and the drive 2 can communicate with each other in accordance with a standard other than the IEEE 1394 standard.

Figure 2:
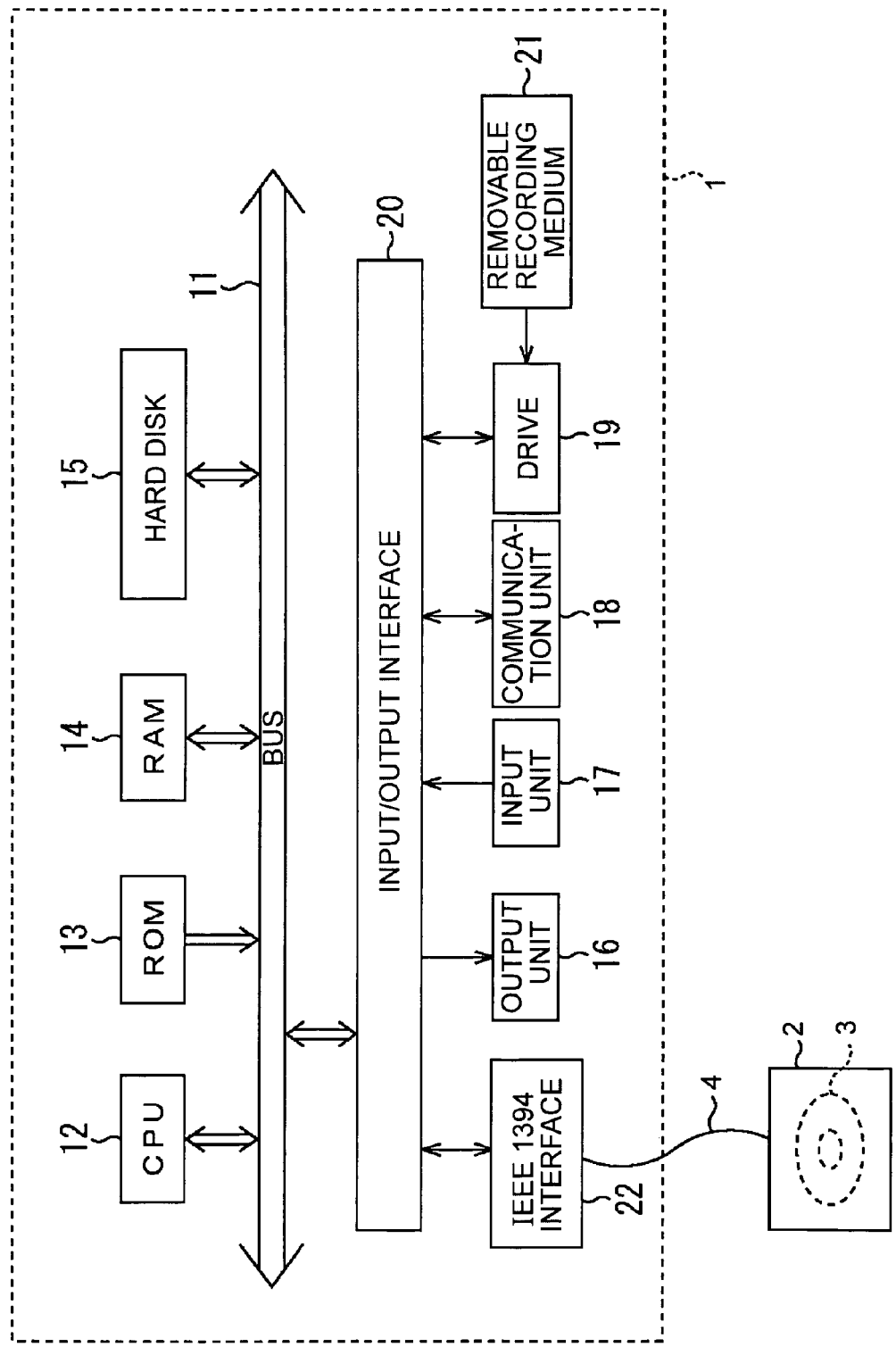
FIG. 2 is a block diagram showing an example of the configuration of the PC shown in FIG. 1.

Next, FIG. 2 shows an example of the configuration of the hardware of the PC 1 shown in FIG. 1.

The PC 1 has a built-in central processing unit (CPU) 12. The CPU 12 connects to an input/output interface 20 through a bus 11. When an instruction is input to the CPU 12 through the input/output interface 20 by operating an input unit 17 including a keyboard, a mouse, and a microphone, the CPU 12 executes a program stored in a read-only memory (ROM) 13. Alternatively, after loading, into a random access memory (RAM) 14, one of a program stored in a hard disk 15, a program installed into the hard disk 15 after being transferred from a satellite or a network and being received by a communication unit 18, and a program installed in the hard disk 15 after being read from a removable recording medium 21 loaded into the drive 19, the CPU 12 executes the loaded program. This allows the CPU 12 to perform processing in accordance with flowcharts (described later) or processing based on block diagram configurations (described later). The CPU 12 controls an output unit 16, which includes a liquid crystal display and a speaker, to output the result of the processing, controls the communication unit 18 to transmit the result of the processing, and performs recording of the result of the processing in the hard disk 15, through the input/output interface 20, if necessary.

In the PC 1, an IEEE 1394 interface 22 that controls communication in accordance with the IEEE 1394 standard is connected to the input/output interface 20. The drive 2 is connected to the IEEE 1394 interface 22 by the IEEE 1394 cable 4. By accessing the drive 2 through the bus 11, the input/output interface 20, the IEEE 1394 interface 22, and the IEEE 1394 cable 4, the CPU 12 can read and record data on the optical disc 3 loaded into the drive 2.

The CPU 12 executes the programs of the OS and various applications. These programs can be recorded on the hard disk 15 or in the ROM 13, which is a built-in recording medium in the PC 1.

Alternatively, the programs can be temporarily or eternally stored (recorded) in the removable recording medium 21, such as a flexible disk, CD-ROM (compact-disk read-only memory), a magneto-optical disc, DVD (digital versatile disk), a magnetic disk, or a semiconductor memory. This removable recording medium 21 can be provided as so-called "package software".

Each program can be installed from the removable recording medium 21 into the PC 1, and, in addition, the program can be transferred from a download site to the PC 1 through a satellite for digital satellite broadcasting, and can be transferred by wire to the PC 1 through a network such as the Internet. In the PC 1, the program transferred as described above can be received by the communication unit 18 and can be installed in the hard disk 15.

Figure 3:
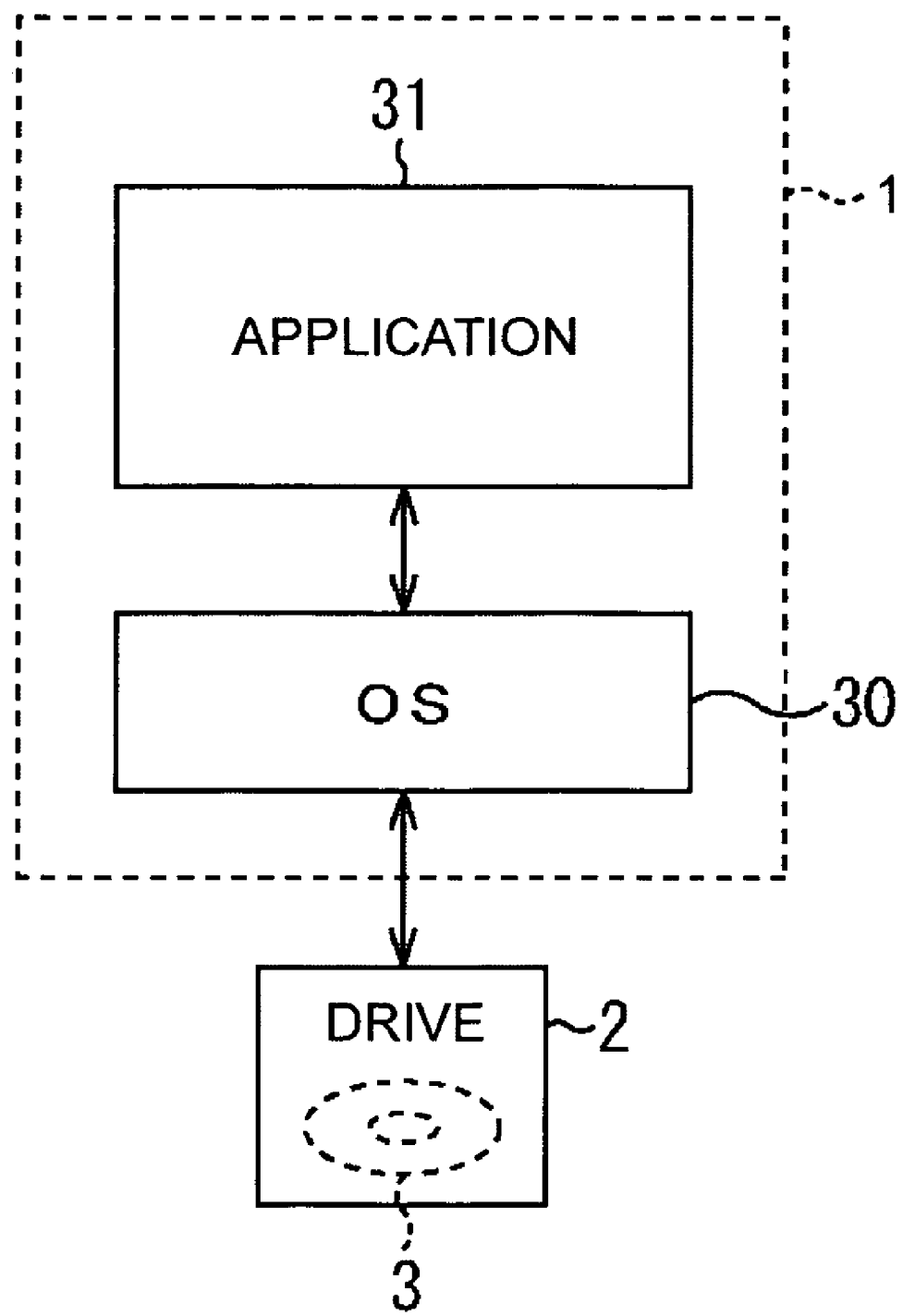
FIG. 3 is a block diagram showing a program executed by the CPU shown in FIG. 2.

Next, FIG. 3 shows a program executed by the CPU 12 shown in FIG. 2.

For example, in a state in which an OS 30 and an application (program) 31 are installed at least in the hard disk 15 shown in FIG. 2, when the PC 1 is supplied with power, the OS 30 is loaded from the hard disk 15 into the RAM 14 and is executed by the CPU 12. In addition, for example, when a user requests activation of the application 31 by performing an operation such as operating the input unit 17, the CPU 12 loads the application 31 from the hard disk 15 into the RAM 14 and executes the loaded application under the control of the OS 30.

When the application 31 issues an access request concerning a file operation on, for example, the optical disc 3 loaded into the drive 2, the OS 30 processes the access request. This allows the drive 2 to record, on the optical disc 3, data whose recording is requested by the access request from the application 31. Alternatively, data whose playback (reading) is requested by the access request from the application 31 is read from the optical disc 3 and is passed to the application 31, which issues the access request.

The application installed into the hard disk 15 shown in FIG. 2 is not limited to one application 31, but the number of applications may be two or more.

The application 31 should be an AV application that performs, for example, acquisition of AV data from the exterior, and editing, recording, and playback of AV data. However, the application 31 does not need to be an AV application. In other words, the application 31 may be, for example, an application for performing text data editing, etc., or a file display application (e.g., a file utility such as "Explorer" or "File Manager").

Next, as the OS 30, for example, UNIX™, LINUX™, MICROSOFT WINDOWS™, or another arbitrary OS may be employed. In this embodiment, for example, a WINDOWS NT™ OS is employed as the OS 30. Presently, Windows NT operating systems include "Windows NT", "Windows 2000", and "Windows XP".

Figure 4:
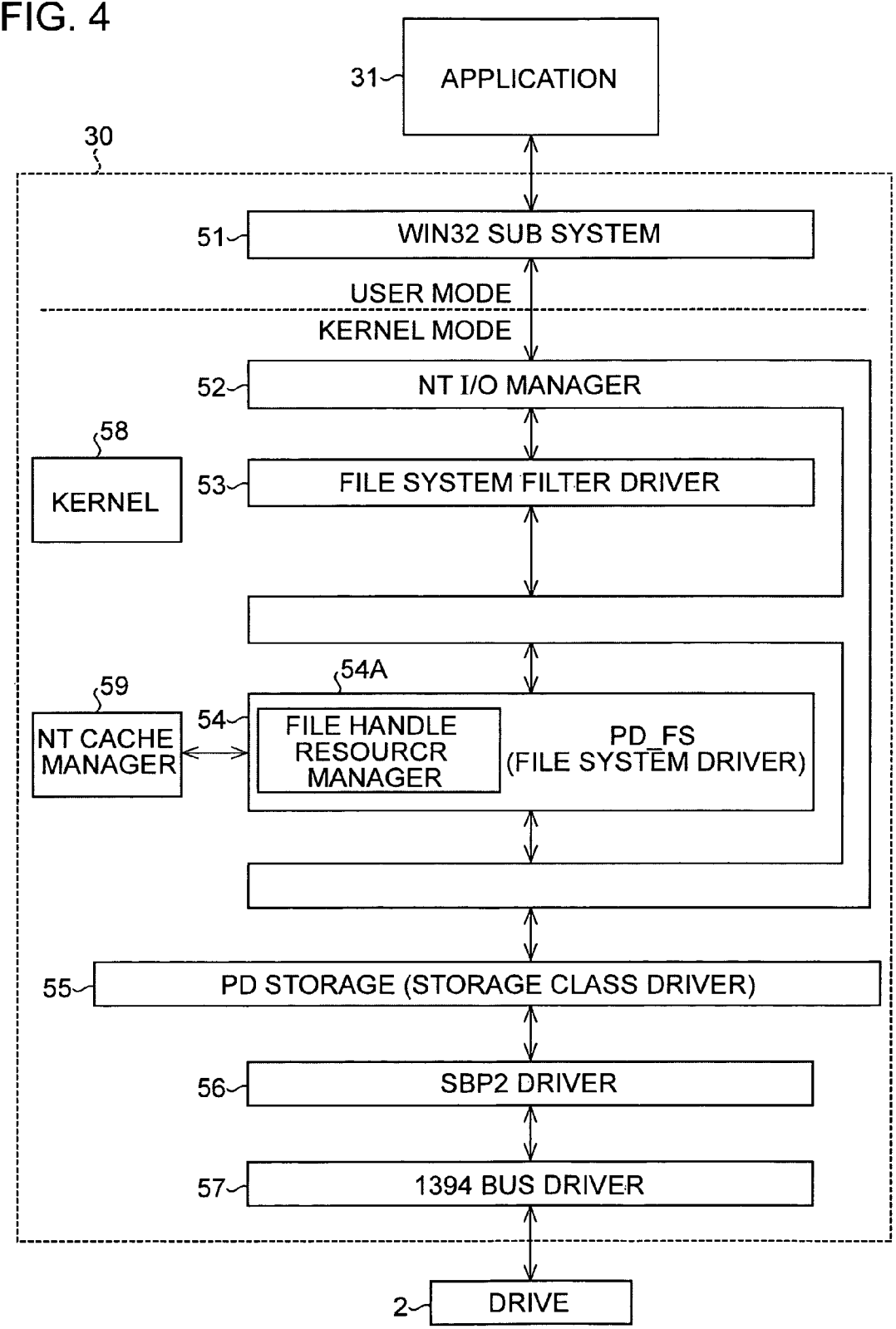
FIG. 4 is a block diagram showing an example of the internal configuration of the OS shown in FIG. 3.

FIG. 4 shows an example of the configuration of part of the OS 30 concerning accessing of the drive 2 (or the optical disc 3) when a WINDOWS NT™ OS is employed as the OS 30.

In FIG. 4, the layer configuration of device drivers in the OS 30 is shown so that their relationship with the application 31 is clarified.

In the OS 30, which is the WINDOWS NT™ OS, services are separated, with a kernel 58 provided with a portion that performs minimum necessary processing, such as processing dependent on hardware, and the separated services are implemented by subsystems.

A Win32 subsystem 51 is one of subsystems. The Win32 subsystem 51 provides the application 31 with various APIs (functions), and performs, for example, memory management, process management, graphics management, etc.

In other words, when, for example, an API (application program interface) function related to input/output is called by the application 31, the Win32 subsystem 51 outputs, to an NT I/O manager 52, an I/O request responsive to the API function.

API functions provided by the Win32 subsystem 51 include "CreateFile( )" for creating a file, "ReadFile( )" for reading a file (data recorded in a file), "WriteFile( )" for recording to a file (recording data in a file), "CloseFile( )" for closing a file, and "DeviceIoControl( )" for performing various types of other processing.

The NT I/O manager 52 provides a layered device driver with service for passing an I/O request packet (IRP).

IRPs have information of processing which is requested from the device driver. The IRPs include, for example, a code for classifying the content of a request, "IRP_MJ_READ" for requesting reading (playback) of data (file), "IRP_MJ_WRITE" for requesting writing (recording) of data, "IRP_MJ_CREATE" for requesting opening of a file, IRP_MJ_CLOSE for requesting closing of a file, "IRP_MJ_DEVICE_CONTROL" for requesting various types of other processing. In an IRP of IRP_MJ_DEVICE_CONTROL, an IOCTL (I/O control) code is designated as a subcode. This IOCTL can be defined by a user.

The NT I/O manager 52 converts, for example, an I/O request by the Win32 subsystem 51, which corresponds to CreateFile( ) into an IRP of IRP_MJ_CREATE. In addition, for example, ReadFile( ) and WriteFile( ) are converted into IRPs of IRP_MJ_READ and IRP_MJ_WRITE, respectively, and DeviceIoControl( ) is converted into an IRP of IRP_MJ_DEVICE_CONTROL.

In the WINDOWS NT™ OS, IRPs are used in layers equal to or higher than the layer of a storage class driver layer.

In FIG. 4, there are three device drivers equal to or higher in layer level than the storage class driver layer, that is, a PD storage 55, which is a storage class driver, a PD_FS 54, which is a file system driver in a layer next higher than the storage class driver, an FS (file system) filter driver 53 in a layer next higher than the storage class driver.

Accordingly, in this embodiment, the NT I/O manager 52 provides service for passing IRPs to the FS filter driver 53, the PD_FS 54, and the PD storage 55.

Specifically, the NT I/O manager 52 converts an I/O request from the Win32 subsystem 51 into an IRP, and outputs the IRP to, for example, the FS filter driver 53. The FS filter driver 53 outputs, for example, to the NT I/O manager 52, a request responsive to the IRP from the NT I/O manager 52. The NT I/O manager 52 converts the request from the FS filter driver 53 into an IRP and outputs the IRP to the PD_FS 54 in a next lower layer. The PD_FS 54 outputs, for example, to the NT I/O manager 52, a request responsive to the IRP from the NT I/O manager 52. The NT I/O manager 52 converts the request from the PD_FS 54 into an IRP and outputs to the IRP to the PD storage 55 in a next lower layer.

The FS filter driver 53 is a file system driver (described later) higher in level than the PD_FS 54. The FS filter driver 53 is supplied from the application 31 through the Win32 subsystem 51 and the NT I/O manager 52. The FS filter driver 53 performs filtering a file system request related to a file system and other requests, obtains, as the result of filtering, a request to be passed to the PD_FS 54, and performs processing such as outputting the request to the PD_FS 54 through the NT I/O manager 52. As the FS filter driver 53, for example, a standard file system driver in the Windows NT, used as the OS 30, may be used.

The PD_FS 54 is a file system driver for file management of the drive 2 as the PD drive outputs, to the PD storage 55, through the NT I/O manager 52, requests such as file recording and reading requested by the FS filter driver 53 through the NT I/O manager 52.

In the file system of the drive 2, file management, such as data reading and recording control in units of logical blocks, file allocation management, defect processing, and free area management, is performed. Thus, the PD_FS 54 does not perform the above file management (file management performed in the file system of the drive 2). However, it appears to the application 31 as if the file management in the file system of the drive 2 were performed by the PD_FS 54. Accordingly, it may be said that the PD_FS 54 camouflages the file system of the drive 2, and, from this point, the PD_FS 54 is a camouflage file system.

In general, the file system driver has a cache function of caching a file stream (file of data to be recorded (data recorded) in a file) and file meta-information. According to this cache function, for example, a cached file stream and file meta-information can be rapidly obtained without actually accessing the optical disc 3.

In the Windows NT OS, an NT Cache manager 59 has a cache function, and the PD_FS 54 uses the NT cache manager 59 to provide the cache function.

The PD_FS 54 includes a file handle resource manager 54A, and the file handle resource manager 54A performs exclusive control (described later).

The PD storage 55 is a storage class driver corresponding to the actual device driver of the drive 2 as the PD drive. The PD storage 55 converts an IRP, which is a request supplied from the PD_FS 54 (a disc driver in a higher layer) through the NT I/O manager 52, into a SCSI (Small Computer System Interface) code, and outputs the SCSI code to an SBP2 (Serial Bus Protocol 2) driver 56.

The reason that the IRP is converted to the SCSI code by the PD storage 55 is that the SCSI code has a so-called good affinity to SBP2 handled by the SBP2 driver 56 in a subsequent stage.

The SBP2 driver 56 converts the SCSI code from the PD storage 55 into SBP2 data in accordance with SBP2, and supplies the SBP2 data to an IEEE 1394 bus driver 57.

In this embodiment, SBP2 is employed as a protocol capable of handling a file system in communication which is in accordance with the IEEE 1394 standard and which is controlled by the IEEE 1394 bus driver 57, which is subsequent in stage to the SBP2 driver 56. However, a protocol other than SBP2 can be used.

By controlling the IEEE 1394 interface 22 (FIG. 2), the IEEE 1394 bus driver 57 transmits SBP2 data or the like from the SBP2 driver 56 to the drive 2, and receives data read from the optical disc 3.

Although, in this embodiment, communication in accordance with the IEEE 1394 standard is performed between the PC 1 and the drive 2, another type of communication can be performed therebetween. In this case, instead of the IEEE 1394 bus driver 57, a bus driver matching the communication between the PC 1 and the drive 2 can be used.

The application 31, which is an AV application, can be sold in a form recorded in, for example, the removable recording medium 21 (FIG. 2), together with the PD_FS 54 and the PD storage 55, which are necessary to use the drive 2 as the PD drive.

The removable recording medium 21, in which the application 31, the PD_FS 54, and the PD storage 55 are recorded, can be sold not only as a single item but also as an accessory for the drive 2 in a form included in a package of the drive 2.

In FIG. 4, the application 31 and the Win32 subsystem 51 operates in a user mode, and the NT I/O manager 52, the FS filter driver 53, the PD_FS 54, the PD storage 55, the SBP2 driver 56, the IEEE 1394 bus driver 57, a kernel 58, and the NT cache manager 59 operate in a kernel mode.

In the case of FIG. 4, by passing the IRP to the FS filter driver 53, which is a file system filter driver, and the PD_FS 54, which is a file system driver, the NT I/O manager 52 requests processing from the file system filter driver and the file system driver. However, the NT I/O manager 52, which is a Windows NT OS, can request processing by passing, not only the IRP but also FastIO to the file system filter driver and the file system driver.

In other words, the NT I/O manager 52 provides the file system filter driver and the file system driver with service for passing FastIO in addition to the IRP, whereby processing is requested from the file system filter driver and the file system driver.

Therefore, in general, the file system filter driver and file system driver in the Windows NT OS support both IRP and FastIO.

According to FastIO, for example, file reading and writing are directly performed for the NT cache manager 59.

In the following description, between an IRP and FastIO, for example, the IRP is used. However, the following functions can be realized also by FastIO.

Figure 5:
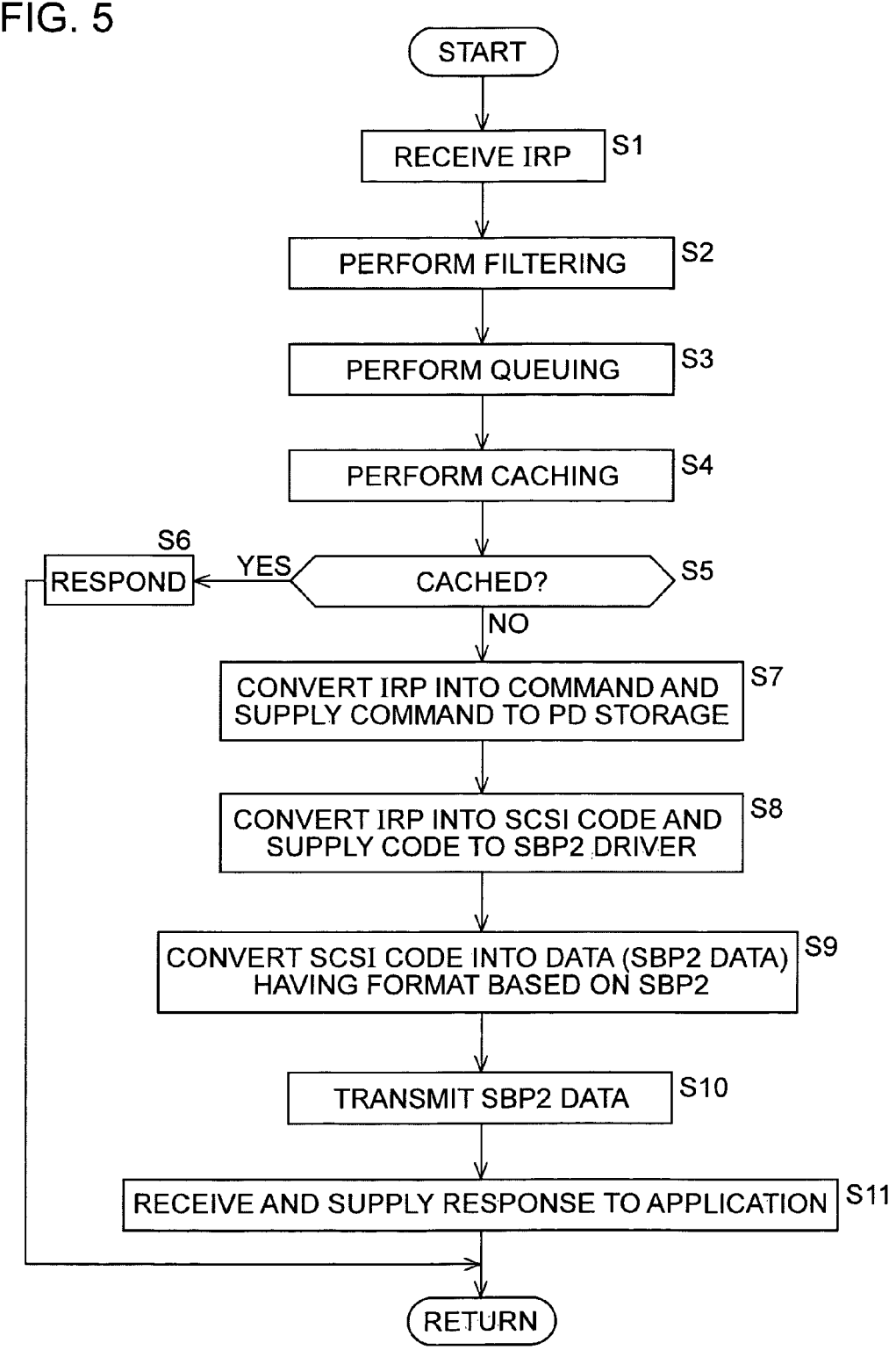
FIG. 5 is a flowchart illustrating an overview of a process performed by the OS shown in FIG. 3.

Next, an overview of processes in the FS filter driver 53, the PD_FS 54, the PD storage 55, the SBP2 driver 56, and the IEEE 1394 bus driver 57, which are performed when the application 31 requests accessing of the optical disc 3, is described below with reference to the flowchart shown in FIG. 5.

In the following description, and FIG. 5 and the subsequent drawings, a description and illustration of the Win32 subsystem 51 and the NT I/O manager 52 are omitted, if necessary.

When the application 31 calls, for example, an API function for requesting accessing of the optical disc 3, a request responsive to the API function is supplied from the Win32 subsystem 51 to the NT I/O manager 52, the NT I/O manager 52 supplies the FS filter driver 53 with an IRP complying with the request from the Win32 subsystem 51.

In step S1, the FS filter driver 53 receives the IRP from the NT I/O manager 52 and proceeds to step S2. In step S2, the FS filter driver 53 filters the IRP from the NT I/O manager 52. In step S3, the FS filter driver 53 queues the IRP, which is to be supplied to the PD_FS 54. In other words, the FS filter driver 53 supplies and stores the IRP from the NT I/O manager 52 in a queue (not shown).

The FS filter driver 53 also reads the IRP stored in the queue and supplies the read IRP to the PD_FS 54 through the NT I/O manager 52. The process proceeds to step S4.

Processing by the FS filter driver 53 differs depending on filter properties. Accordingly, this embodiment shows one example of the processing, and the processing by the FS filter driver 53 is not limited to the example.

In step S4, the PD_FS 54 performs, on data requested by the IRP from the FS filter driver 53, caching that is necessary to use a cache function of the NT cache manager 59. Proceeding to step S5, the PD_FS 54 determines whether, for example, the data requested by the IRP from the FS filter driver 53 is cached in the NT cache manager 59.

If, in step S5, it is determined that the data requested by the IRP from the FS filter driver 53 is cached in the NT cache manager 59, the process proceeds to step S6. In step S6, the PD_FS 54 receives, from the NT cache manager 59, the data requested by the IRP from the FS filter driver 53, and sends back a response to the IRP to the application 31, which calls the API function corresponding to the IRP, through the Win32 subsystem 51.

Alternatively, if, in step S5, it is determined that the data requested by the IRP from the FS filter driver 53 is not cached in the NT cache manager 59, the process proceeds to step S7. In step S7, the PD_FS 54 converts the IRP from the FS filter driver 53 into a command, as described later, and supplies the command to the PD storage 55 through the NT I/O manager 52. The process proceeds to step S8.

In step S8, the PD storage 55 converts the IRP from the PD_FS 54 into a corresponding SCSI code, and supplies the SCSI code to the SBP2 driver 56. The process proceeds to step S9. In step S9, the SBP2 driver 56 converts the SCSI code from the PD storage 55 into SBP2 data, and supplies the SBP2 data to the IEEE 1394 bus driver 57. The process proceeds to step S10.

In step S10, by controlling the IEEE 1394 interface 22 (FIG. 2), the IEEE 1394 bus driver 57 transmits the SBP2 data from the SBP2 driver 56 to the drive 2.

The IEEE 1394 bus driver 57 waits for a response to the SBP2 data transmitted in step S10 to be transmitted from the drive 2. In step S11, the IEEE 1394 bus driver 57 receives the response, and sends back the response to the application 31, which transmits the IRP received in step S1, through the PD storage 55, the PD_FS 54, the PD storage 55, and the Win32 subsystem 51.

Next, a dedicated file system included in the drive 2 and a protocol employed in the drive 2 are described below with reference to FIG. 6.

The drive 2 is a PD drive capable of recording or playing back high bit rate AV data in real time, as described above, and has a real file system 61 and a virtual file system 62 as dedicated file systems. Although the drive 2 may be a drive that performs only recording or only playback, it is a drive capable of both recording and playback in this embodiment.

The real file system 61 manages real (actual) files on the optical disc 3 in accordance with, for example, the UDF, and controls reading and recording of data on the optical disc 3 in units of logical blocks. The real file system 61 has a PD file allocation manager (not shown). The PD file allocation manager controls unicursal recording and performs allocation management for files on the optical disc 3, defect processing, free area management, etc.

The virtual file system 62 performs processing such as filtering on the real files on the real file system 61, and provides resultant files (virtual files) to the exterior of the drive 2. Thus, in the exterior of the drive 2, the virtual file system 62 is provided. Accordingly, the drive 2 has a communication function based on a protocol that can provide the real files managed by the real file system 61, as virtual files managed by the virtual file system 62, to the exterior.

In this embodiment, in the drive 2, AV data, text data, and other arbitrary data can be read and recorded through the virtual file system 62.

In the drive 2, for example, a protocol, obtained by extending commands of SBP2 (IEEE1394 SBP2 Protocol), which is a protocol capable of controlling peripheral devices in IEEE 1394 communication (communication based on the IEEE 1394 standard), is employed as a protocol capable of providing (the virtual files managed by) the virtual file system 62 to the exterior.

When the protocol obtained by extending commands of SBP2 is referred to as PD-SBP2, PD-SBP2 provides functions similar to those of the interface (API) provided by the Win32 subsystem 51 (FIG. 4) of the OS 30 when the application 31 or the like in the application layer on the PC 1 accesses a file. Therefore, according to PD-SBP2, for example, by specifying a file name, file stream reading and writing can be performed for a file having the file name, and meta-information of the file can be acquired based on the file name and path name of the file.

Since, as described above, PD-SBP2 is a protocol obtained by extending commands of SBP2 (IEEE1394 SBP2 Protocol) for use in IEEE 1394 communication, the drive 2, which employs such a protocol, is connected to the IEEE 1394 bus driver 57 for controlling IEEE 1394 communication, and, in addition, the IEEE 1394 bus driver 57 is connected to the SBP2 driver 56, in which SBP2 is implemented.

When the OS 30 is a Windows NT OS, those included in the OS can be used as both the SBP2 driver 56 and the IEEE 1394 bus driver 57.

Figure 6:
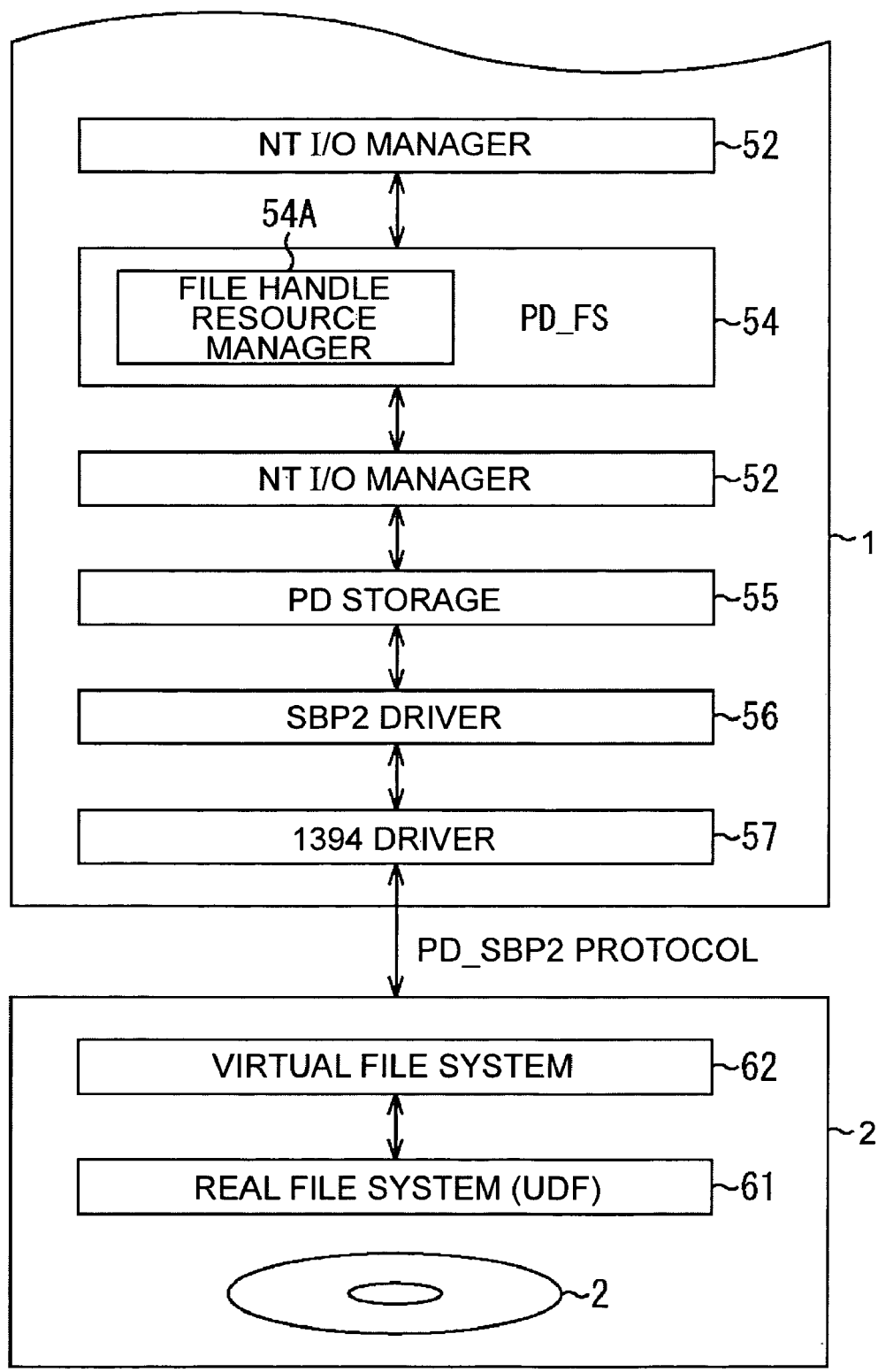
FIG. 6 is a block diagram showing a file system in the drive shown in FIG. 1 and a protocol employed in this drive.

Next, processing of the virtual file system 62 in FIG. 6 is described below with reference to FIG. 7.

Figure 7:
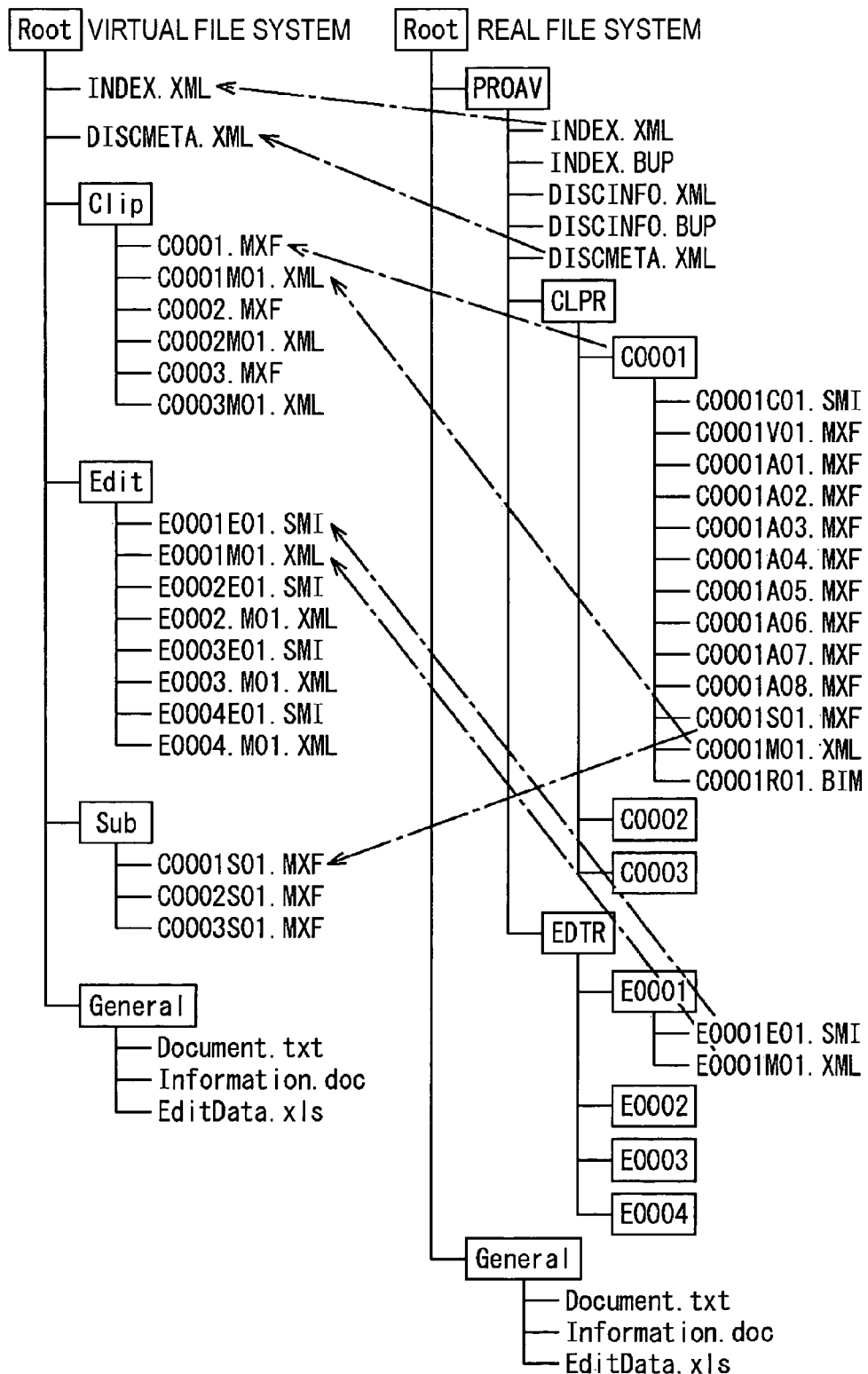
FIG. 7 is an illustration of the virtual file system shown in FIG. 6.

Referring to FIG. 7, on the right side, the real files managed by the real file system 61 are shown, and, on the left side, the virtual files provided from the virtual file system 62 to the exterior of the drive 2 are shown.

At first, the real files of the virtual file system 62, shown on the right side of FIG. 7 are described below.

In the following description, alphanumeric characters that follow "directories" represent the directory names of the directories. Similarly, alphanumeric characters that follow "files" represent the file names of the files. In addition, in each file name, alphanumeric characters that follow a period represent an extension. For example, the extension "XML" represents an XML (extensible Markup Language) file. For example, the extension "MXF" represents an MXF file.

The root directory (indicated by "ROOT") for the real files has the directory "PROAV" that has a directory storing information concerning material data, such as video data and audio data, and edit lists representing the results of editing of the material data, and files (directories) related to other AV data, and a general directory (indicated by "General") storing files of arbitrary data other than files related to AV data, for example, "files Document.txt", "Information.doc", and "EditData.xls".

For example, MXF files are employed as the files related to AV data. In addition, MXF files, which are the real files managed by the real file system 61, are used as MXF OP-Atom files in which video data and audio data are treated as separate files, and are managed by the virtual file system 62. The virtual files provided to the exterior are used as an MXF OP-1*a* file in which video data and audio data are interleaved into one file.

The directory PROAV has index files INDEX.XML and INDEX.BUP, disc information files DISCINFO.XML and DISKINFO.BUP, disc meta-file DISCMETA.XML.

The index files INDEX.XML and INDEX.BUP include management information for managing all clips and edit lists recorded on the optical disc 3.

A clip is, for example, a set of some amount of data, such as video data recorded on the optical disc 3 by recording at a time, and audio data corresponding to the video data. An edit list is an editing procedure list for the case of performing so-called "nonlinear editing. For example, when AV data of a file is cut in nonlinear editing, information, such as a file name identifying the file, a cut-in point, and a cut-out point, are recorded in the edit list.

The disc information files DISCINFO.XML and DISKINFO.BUP are metadata for the entire data recorded on the optical disc 3. They are, for example, files including a disc attribute and a playback start position.

The disc information file DISKINFO.BUP is a backup file (copy) of the disc information file DISCINFO.XML. Similarly, also the above index file INDEX.BUP is a backup file of the index file INDEX.BUP.

The disc meta-file DISCMETA.XML includes titles and comments for all the material data recorded on the optical disc 3, and information such as a path to video data corresponding to a representative image that is a frame serving as a representative of all the video data recorded on the optical disc 3.

The directory PROAV has clip root directory CLPR in which a lower directory has clip data, and edit list root directory EDTR in which a lower directory has edit list data.

In the clip root directory CLPR, clip data recorded on the optical disc 3 is managed with it divided into different directories in units of clips. For example, on the right side of FIG. 7, data of three clips is managed in a form divided into three clip directories, C0001, C0002, and C0003.

In other words, data items of first clip #1 recorded on the optical disc 3 are managed as files in clip directory C0001, data items of second clip #2 recorded on the optical disc 3 are managed as files in clip directory C0002, and data items of third clip #3 recorded on the optical disc 3 are managed as files in directory C0003.

In clip directory C0001, the files of first clip #1 recorded on the optical disc 3 are disposed.

On the right side of FIG. 7, clip directory C0001 has clip information file C0001C01.SMI for managing clip #1, video data file C0001A01.MXF, which includes video data of clip #1, eight audio data files C0001A01.MXF to C0001A08.MXF corresponding to eight audio data channels of clip #1, low resolution data file C0001S01.MXF including low-bit-rate video data of clip #1, clip metadata file C0001M01.XML including clip metadata which corresponds to material data of clip #1, and which is metadata whose real-time property is not requested, such as a conversion table of correspondences between longitudinal time codes (LTC) and frame numbers, and frame metadata file C0001R01.BIM including frame metadata which corresponds to the material data of clip #1, and which is metadata whose real-time property is requested, such as LTC.

Other clip directories C0002 and C0003 on the right side of FIG. 7 have, for clips #2 and #3, files similar to those in clip directory C0001.

In edit list root directory EDTR below directory PROAV, the edit lists recorded on the optical disc 3 are managed in different directories in units of editing processes. On the right side of FIG. 7, four edit lists are managed in four different directories E0001, E0002, E0003, and E0004. In other words, edit list #1 showing the result of editing the clips recorded on the optical disc 3 in the first time is managed as a file in edit list directory E0001. Edit list #2 showing the result of editing the clips recorded on the optical disc 3 in the second time is managed as a file in edit list directory E0002. Edit list #3 showing the result of editing the clips recorded on the optical disc 3 in the third time is managed as a file in edit list directory E0003. Edit list #4 showing the result of editing the clips recorded on the optical disc 3 in the fourth time is managed as a file in edit list directory E0004.

On the right side of FIG. 7, in edit list directory E0001, edit list file E0001E01.SMI, which is a file of edit list #1, and edit-list clip metadata file E0001M01.XML, which includes clip metadata corresponding to material data (part extracted as edited data in the material data of all the clips used in editing) obtained after editing in accordance with edit list #1, or new clip metadata created based on the clip metadata.

In FIG. 7, edit-list clip metadata file E0001M01.XML includes new clip metadata created based on clip metadata (clip metadata file (on the right side of FIG. 7, for example, clip metadata file C0001M01.XML in directory C0001) in a directory below clip root directory CLPR) of clips used in editing. For example, when editing is performed for clip #1, from the clip metadata included in clip metadata file C0001M01.XML, portions corresponding to edited material data are extracted. The portions are used to rebuild new clip metadata in which the edited material data is used as a clip, and are managed as an edit-list clip metadata file. In other words, new clip metadata in which the edited material data is used as a clip is added to the edited material data, and the clip metadata is managed as an edit-list clip metadata file. Therefore, the edit-list clip metadata file is created for each time editing is performed.

On the right side of FIG. 7, other edit list directories E0002 to E0004 has files for edit lists #2 to #4 similarly to these in edit list directory E0001.

The above real files, shown on the right side of FIG. 7, managed by the real file system 61, are provided to the exterior of the drive 2 in the form of the virtual file system 62 shown on the left side of FIG. 7.

In other words, in the virtual file system 62, in the root directory (ROOT), index file INDEX.XML and disc metafile DISCMETA.XML are disposed, and directories Clip, Edit, Sub, and General are provided.

In the virtual file system 62, index file INDEX.XML and disc metafile DISCMETA.XML disposed in the root directory (ROOT) are index file INDEX.XML and disc metafile DISCMETA.XML managed by the real file system 61, respectively.

In addition, in the virtual file system 62, in directory Clip, data files of a clip in a directory below directory CLPR managed by the real file system 61 are disposed.

In other words, on the left side of FIG. 7, in directory Clip, files C0001.MXF, C0002.MXF, and C0003.MXF are provided as data files of clips in directories C0001, C0002, and C0003 on the right side of FIG. 7, respectively.

In the real file system 61, as described above, the clip data is treated as MXF OP-Atom files in which video data and audio data are treated as separate files.

In other words, in directory C0001 on the right side of FIG. 7, data of clip #1 is divided into video data file C0001V01.MXF including video data of clip #1, and audio data files C0001A01.MXF to C0001A08.MXF corresponding to eight channels of audio data in clip #1.

In addition, in the virtual file system 62, as described above, clip data is used as an MXF OP-1$a$ file in which video data and audio data are interleaved into one file.

File C0001.MXF in the directory Clip on the left side of FIG. 7 is a file in which video data and audio data in clip #1 in directory C0001 on the right side of FIG. 7 are interleaved.

In other words, file C0001.MXF is a file in which video data of video data file C0001V01.MXF in directory C0001 and eight channels of audio data of audio data files C0001A01.MXF to C0001A08.MXF are interleaved.

Similarly, file C0002.MXF in directory Clip is a file in which video data and audio data in clip #2 in directory C0002 are interleaved, and file C0003.MXF is a file in which video data and audio data in clip #3 in directory C0003 are interleaved.

In directory Clip on the left side of FIG. 7, clip metadata in each clip is also disposed.

In directory Clip on the left side of FIG. 7, clip metadata files C0001M01.XML, C0002M01.XML, and C0003M01.XML are disposed. Clip metadata file C0001M01.XML in directory Clip is a clip metadata file in clip #1, and is a clip metadata file C0001M01.XML in directory C0001 on the right side of FIG. 7.

Similarly, clip metadata file C0002M01.XML in directory Clip is a clip metadata file in clip #2 and is a clip metadata file in directory C0002 on the right side of FIG. 7. Similarly, clip metadata file C0003M01.XML in directory Clip is a clip metadata file in clip #3 and is a clip metadata file directory C0003 on the right side of FIG. 7.

In directory Edit in the root directory (ROOT) on the left side of FIG. 7, files in a directory below directory EDTR on the right side of FIG. 7 are disposed.

In directory Edit, files E0001E01.5MI, E0001M01.XML, E0002E01.5MI, E0002M01.XML, E0003E01.SMI, E0003M01.XML, E0004E01.SMI, and E0004M01.XML are disposed.

Files E0001E01.5MI and E0001M01.XML in directory Edit on the left side of FIG. 7 are files E0001E01.SMI and E0001M01.XML in directory E0001 of edit list #1 on the right side of FIG. 7, respectively.

Similarly, files E0002E01.SMI and E0002M01.XML in directory Edit are files of directory E0002 of edit list #2. Files E0003E01.5M1 and E0003M01.XML in directory Edit are files in directory E0003 of edit list #3. Files E0004E01.5M1 and E0004M01.XML in directory Edit are files in directory E0004 of edit list #4.

In directory Sub on the left side of FIG. 7, low resolution data files of clips are disposed.

In directory Sub on the left side of FIG. 7, specifically, low resolution data files C0001S01.MXF, C0002S01.MXF, and C0003S01.MXF are disposed. Low resolution data file C0001S01.MXF in directory Sub is a low resolution data file of clip #1 and is low resolution data file C0001S01.MXF in directory C0001 on the right side of FIG. 7.

Similarly, low resolution data file C0002S01.MXF in directory Sub is a low resolution data file of clip #2, and is a low resolution data file in directory C0002 on the right side of FIG. 7. In addition, similarly, low resolution data file C0003S01.MXF in directory Sub is a low resolution data file of clip #3, and is a low resolution data file in directory C0002 on the right side of FIG. 7.

In directory General on the left side of FIG. 7, files Document.txt, Infomation.doc, and EditData.xls, in directory GeneralSub on the right side of FIG. 7, are disposed.

The virtual file system 62 (FIG. 6) provides, to the exterior, in the form of a single file (virtual file), video data and audio data of clips in different files managed by the real file system 61.

In the virtual file system 62, among the files managed by the real file system 61, files that do not need to be provided to the exterior (an application or a user), such as files for use inside the drive 2, are filtered, whereby such files are not shown to the exterior.

In this embodiment, in FIG. 7, by performing filtering in the virtual file system 62, backup files INDEX.BUP and DISCINFOBLOCK-UNIT PROCESSING, disk information file DISCINFO.XML, clip information file C0001C01.SMI, frame metadata file C0001R01.BIM, etc., are prevented from being detected from the exterior.

As described above, according to the virtual file system 62, different files of video data and audio data in MXF OP-Atom, which are managed by the real file system 61, can be provided to the exterior in the form of one MXF OP-1a file in which video data and audio data are interleaved into one file. Thus, file handling by the user and the application 31 is facilitated.

In other words, when the different files of video data and audio data in MXF OP-Atom, which are managed by the real file system 61, are provided to the exterior, for example, in order for the user to designate clip #1 for playback and to use the application 31 to play back clip #1, the user needs to designate, for example, video data file C0001V10.MXF of clip #1 and files C0001A01.MXF to C0001A08.MXF of eight channels of audio data of clip #1. The application 31 needs to perform opening a total of nine files C0001V01.MXF and C0001A01.MXF to C0001A08.MXF designated by the user, acquiring their file handles, and reading video data and audio data from the files.

In contract, according to the virtual file system 62, the video data of file C0001V01.MXF in clip #1 and the audio data for eight channels of files C0001A01.MXF to C0001A08.MXF in clip #1 can be provided as one file C0001.MXF. Thus, the user only needs to designate one file C0001.MXF, and, in addition, the application only needs to acquire the file handle of the designated file C0001.MXF for reading data.

Since, according to the virtual file system 62, for the files managed by the real file system 61, filtering is performed, files for use inside the drive 2, etc., such as disc information file DISCINFO.XML, are, so to speak, hidden from the exterior.

Accordingly, the files for use inside the drive 2, etc., can be prevented from being deleted or rewritten by a wrong operation by the user. In addition, hindrance at the time the user searches for a necessary file, due to a state in which files which are not necessary for the user are seen, can be prevented.

As described with reference to FIG. 6, in the drive 2, PD-SBP2 that is a protocol obtained by extending commands in SBP2 (IEEE 1394 SBP2 Protocol) used in IEEE 1394 communication is employed as a protocol for providing the virtual file system 62 to the exterior.

In SBP2, a device called an "initiator" transmits a command to a device called a "target" and the targets sends back a response for the command from the initiator.

Figure 8:
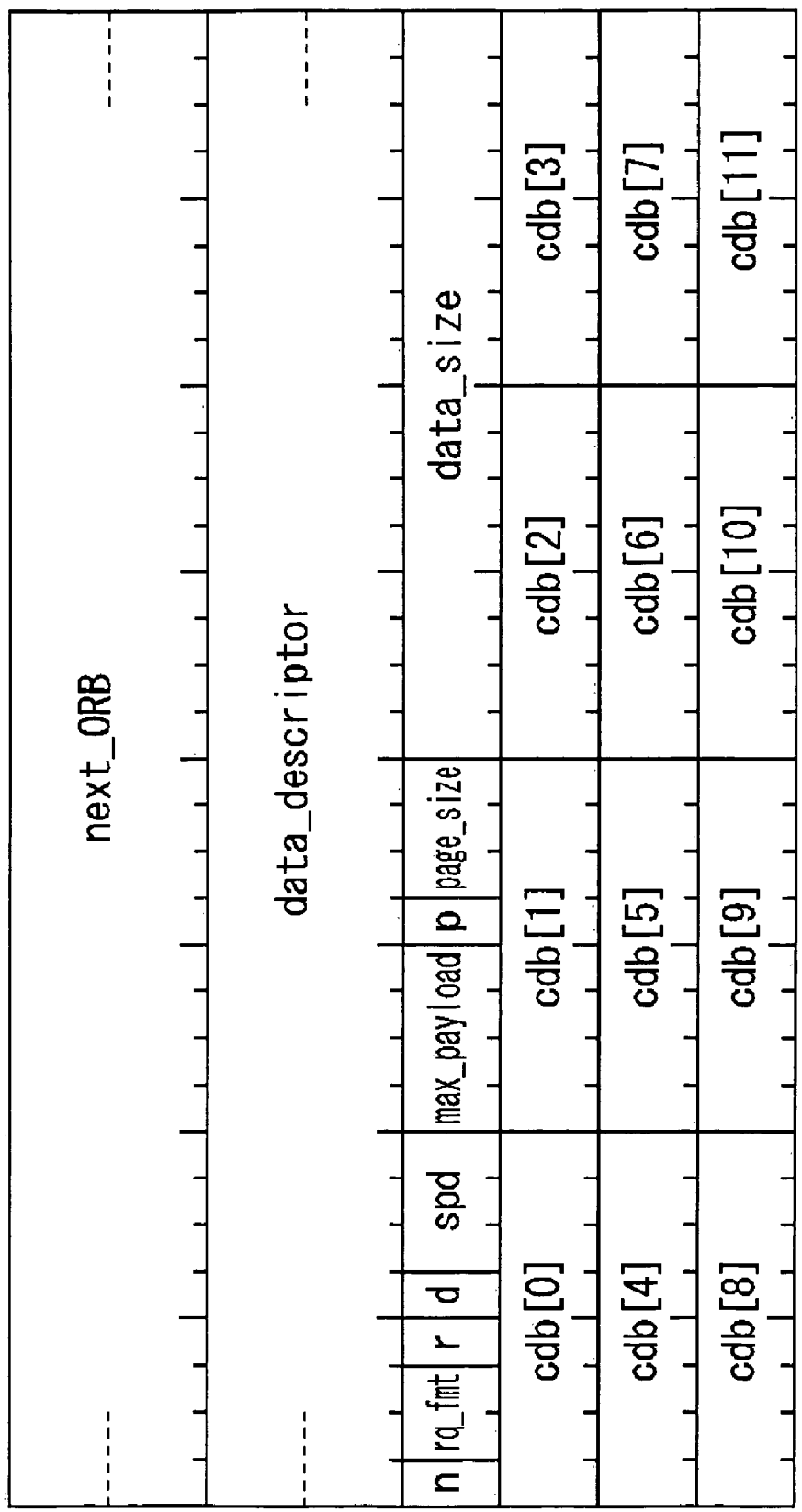
FIG. 8 is an illustration of the format of a SCSI command block ORB.

FIG. 8 shows the format of SCSI command block ORB (operation request blocks) which are SBP2 data in the case of transmitting a command from the initiator to the target. In SBP2, SCSI command block ORB are used for data transfer and device control.

In FIG. 8, in a "next_ORB" field, the address of the next ORB, or null, is set.

A "data_descriptor" field is valid when a "data_size" field is not zero, and the address of a data buffer or a page table is set therein.

In an "n (notify bit) field, information indicating whether or not a notification of completion by the target is necessary is set.

In an "rq_fmt" field, ORB format information is set.

An "r (reserved)" field is a so-called reserved area.

In a "d (direction bit) field, the direction of data transfer is set. In other words, the "d" field represents data reading from the target (target read transactions) when it is zero, and represents data writing to the target (target write transactions) when it is one.

In an "spd (speed) field, a data transfer process speed of the target is set.

In a "max_payload" field, a maximum amount (length) of transfer is set. The maximum amount of transfer is 2 to the power of (max_payload+2).

In a "p (page_table_present bit) field, zero or one is set. In other words, when the address of the data buffer is set in the data_descriptor field, zero is set in the "p" field. In addition, when the address of the page table is set in the data_descriptor field, one is set in the "p" field.

When the "p" field is one, in a "page_size" field, a page size of a memory as the data buffer is set. The page size is 2 to the power of (page_size+8).

When the "p" field is zero, in a "data-size" field, the size of the data buffer is set.

In a "cdb (SCSI command descriptor blocks)" field, that is, twelve "cdb [O]" to "cdb [11]" fields, a SCSI command (code) is set.

In SBP2, among values that can be set in the CDB [O] field, C0h to FFh (h indicates that an alphanumeric letter before the h) represent a vendor specific area.

Accordingly, in PD-SBP2, the value of the vendor specific area is used for command extension (new command definition).

In other words, in PD-SBP2, in the CDB[0] field, (the operation code of) a command is set. In addition, in PD-SBP2, in the CDB[1] to CDB[11] fields, an argument (operand) of a command (extended command) is set, if necessary.

Figure 9:
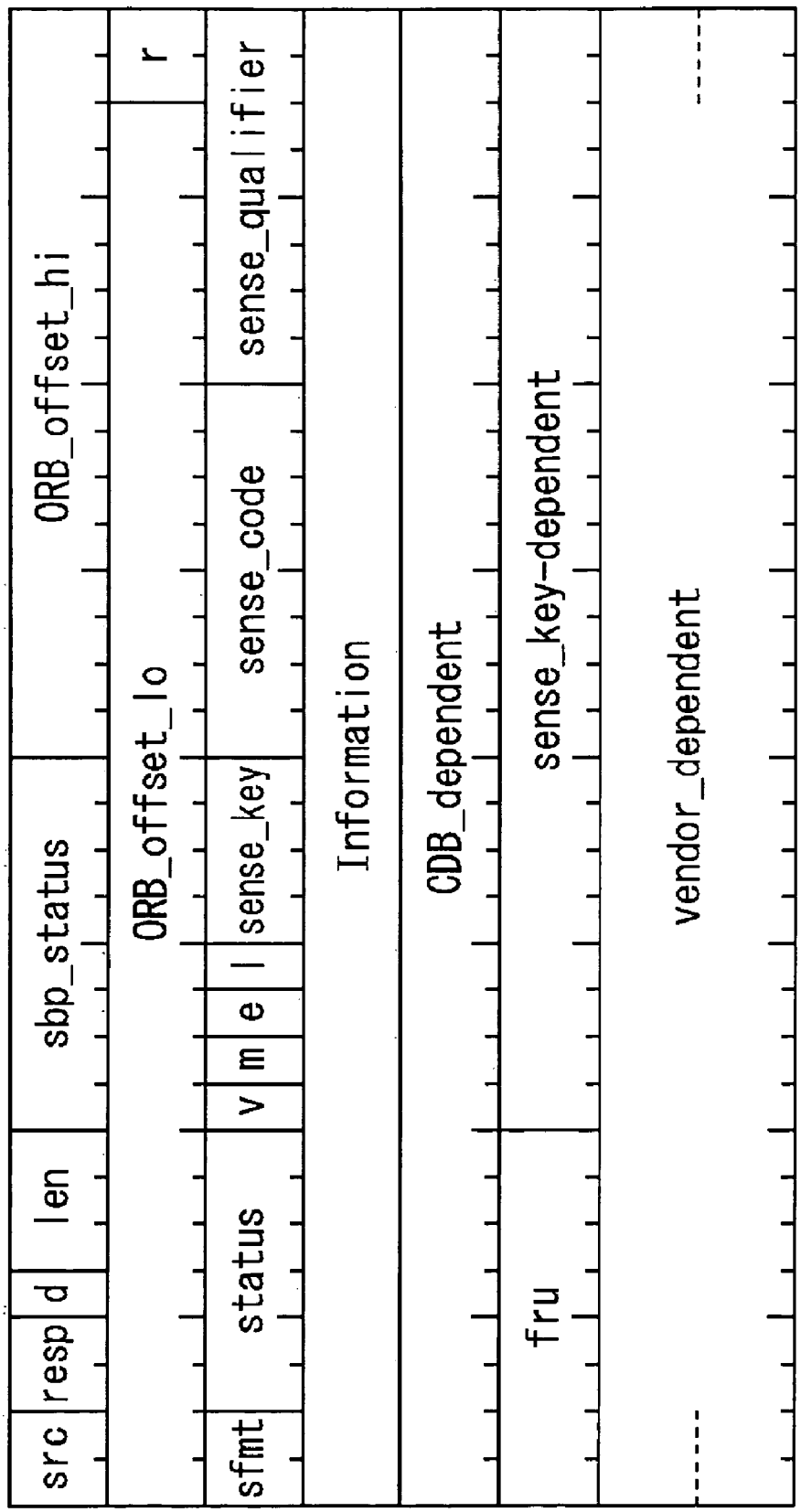
FIG. 9 is an illustration of the format of an SBP2 status block.

Next, FIG. 9 shows the format of a SBP2 status block which is SBP2 data as the response sent back from the target for the command from the initiator. In SBP2, the SBP2 status block is a status block for SCSI sense data and is used when the target sends back completion of a request or a change in status.

In FIG. 9, in an "src" field, a flag representing the origin of the SBP2 status block is set.

In a "resp (response status)" field, information representing a response state is set.

In a "d (dead bit)" field, a flag that indicates that a fetch agent has changed into a dead state due to error is set.

In a "len" field, the size of the SBP2 status block is set. The size of the SBP2 status block is a value obtained by adding one quadlet (32 bits) to the value set in the "len" field.

In an "sbp_status" field, additional information associated with the "resp" field is set.

In an "ORB_offset_hi" field and an "ORB_offset_lo" field, information of the ORB, which causes the SBP2 status block, is set.

An "r (reserved)" field is a reserved area.

In an "sfmt" field, information of the format of the SBP2 status block is set.

In a status field, a SCSI status is set.

In a "v (valid bit)" field, a flag that represents the validity or invalidity of the content of an information field (described below) is set.

In an "m" field, for example, a SCSI mark bit is set, and, in an "e" field, a SCSI eom bit is set. In an "i" field, a SCSI illegal_length_indicator bit is set, and, in a sense_key field, a SCSI sense key is set. In a sense_code field, a SCSI additional sense code is set, and, in a sense_qualifier, a SCSI additional sense code qualifier is set.

In each of an information field, a CDB-dependent field, a "fru" field, a sense_key_dependent field, and a vender-dependent field, information dependent on a device type, a command, or the like, is set.

In PD-SBP2, in the information field, a return value for an extended command is set.

Next, FIG. 10 is a list of commands (extended commands) in PD-SBP2.

In FIG. 10, command "FILE OPEN" uses a file name and a file open mode as arguments, and opens a file specified by the file name as the argument in the file open mode as the argument. For command FILE OPEN, the file handle of the opened file is sent back.

Command FILE CLOSE uses a file handle as an argument and closes a file specified by the file handle.

Command FILE READ uses a file handle and a read size as arguments, and reads data (file stream data) of a file specified by the file handle as the argument by the read size as the argument.

Command FILE WRITE uses a file handle and a write size as arguments, and writes data (file stream data) in a file specified by the file handle as the argument by the write size as the argument.

Command FILE LOGICAL SEEK uses a file handle and a logical position as arguments, and changes the position of the file pointer (current file pointer) of a file specified by the file handle as the argument to the logical position as the argument.

Command SET EOF uses a file handle as an argument, and changes the position of an EOF (End Of File) to a position represented by the file pointer specified by the file handle as the argument.

Command DELETE uses a file name as an argument, and deletes a file having the file name.

Command RENAME uses, as arguments, an unchanged file name (or a directory name) and a changed file name (or a directory name), and changes the unchanged file name to the changed file name.

Command MAKE DIRECTORY uses a directory name as an argument, and generates (creates) a directory having the directory name.

Command REMOVE DIRECTORY uses a directory name as an argument, and deletes a directory having the directory name.

Command LIST OPEN uses a file name (or a directory name) as an argument, and sends back a handle for obtaining a file list having the file name and file meta-information.

Command LIST READ uses a handle sent back by command LIST OPEN as an argument, and reads a file list and file meta-information specified by the handle.

Command FORMAT formats the optical disc 3 loaded into the drive 2.

Command EJECT ejects the optical disc 3 loaded into the drive 2.

Command DISC INFO sends back information concerning the optical disc 3 loaded into the drive 2, that is, for example, a free area of the optical disc 3.

Command SYSTEM sends back information (system information) concerning the drive 2.

Command SETUP enables the drive 2 to receive a PD-SBP2 command. In other words, by receiving command SETUP, the drive 2 becomes able to receive the other commands in FIG. 10.

Next, a PD-SBP2 protocol file read sequence is described below with reference to FIG. 11.

When, in the application 31 (FIG. 4) in the PC 1, data is read from the optical disc 3 in the drive 2, the SBP2 driver 56 serves as the initiator and the drive 2 serves as the target.

In step S21, (the SBP2 driver 56 in) the PC 1 as the initiator transmits command FILE OPEN to the drive 2 as the target. In step S41, the drive 2 receives the command FILE OPEN and proceeds to step S42.

In step S42, the drive 2 opens a file designated by command FILE OPEN from the PC 1, and sends back its file handle to the PC 1. In this case, the file designated by command FILE OPEN is a file that the drive 2 provides to the exterior through the virtual file system 62. Also the file handle sent by the drive 2 is the file handle of a file that the drive 2 provides to the exterior through the virtual file system 62.

In step S22, the PC 1 receives the file handle from the drive 2 and proceeds to step S23. In step S23, the PC 1 transmits, to the drive 2, command FILE LOGICAL SEEK which requests the file pointer of the file specified by the file handle to be moved to a leading position of data to be read.

In step S43, the drive 2 receives command FILE LOGICAL SEEK. The drive 2 moves the file pointer of the file opened in step S42 to the position designated by command FILE LOGICAL SEEK from the PC 1.

Proceeding from step S43 to S44, if the drive 2 has succeeded in moving the file pointer, the drive 2 sends back success response GOOD to the PC 1. If the drive 2 has failed in moving the file pointer, it sends back failure response ERROR to the PC 1.

In step S24, the PC 1 receives the response from the drive 2. If the response from the drive 2 is ERROR indicating that the drive 2 has failed in moving the file pointer, the PC 1 performs, for example, finishing the process.

If the response from the drive 2 is GOOD indicating that the drive 2 has succeeded in moving the file pointer, the PC 1 proceeds from step S24 to S25, and transmits, to the drive 2, command FILE READ for requesting reading of data.

In step S45, the drive 2 receives command FILE READ from the PC 1, and reads data from the position of the file pointer moved in step S43.

Sequentially proceeding to steps 46, to 46.sub.N, the drive 2 transmits the data read in step S45 to the PC 1.

The maximum size of data that can be transmitted at a time from the drive 2 to the PC 1 is limited. Accordingly, when the size of data whose reading is requested by command FILE READ from the PC 1 is greater than the maximum size of data that can be transmitted by the drive 2 at a time, the drive 2 divides the data whose reading is requested by command FILE READ from the PC 1 into, for example, portions which each have the maximum size of data that can be transmitted at a time, and transmits each portion. In the embodiment shown in FIG. 11, the data is transmitted N times from steps 46.sub.1 to 46.sub.N from the drive 2 to the PC 1.

In steps S26.sub.1 to S26.sub.N, the PC 1 receives the data transmitted in steps 46.sub.1 to 46.sub.N. On completing reception of all the data requested by command FILE READ after steps S26.sub.1 to S26.sub.N, the PC 1 proceeds to step S27, and transmits, to the drive 2, command FILE CLOSE for requesting closing of the file whose opening is requested by command FILE OPEN transmitted in step S21.

In step S47, the drive 2 receives command_FILE CLOSE from the PC 1, and closes a file designated by the received command FILE CLOSE.

Further proceeding from step S47 to S48, if the drive 2 has succeeded in closing the file, the drive 2 sends back success response GOOD to the PC 1, and if the drive 2 has failed in closing the file, the drive 2 sends back failure response ERROR.

Figure 12:
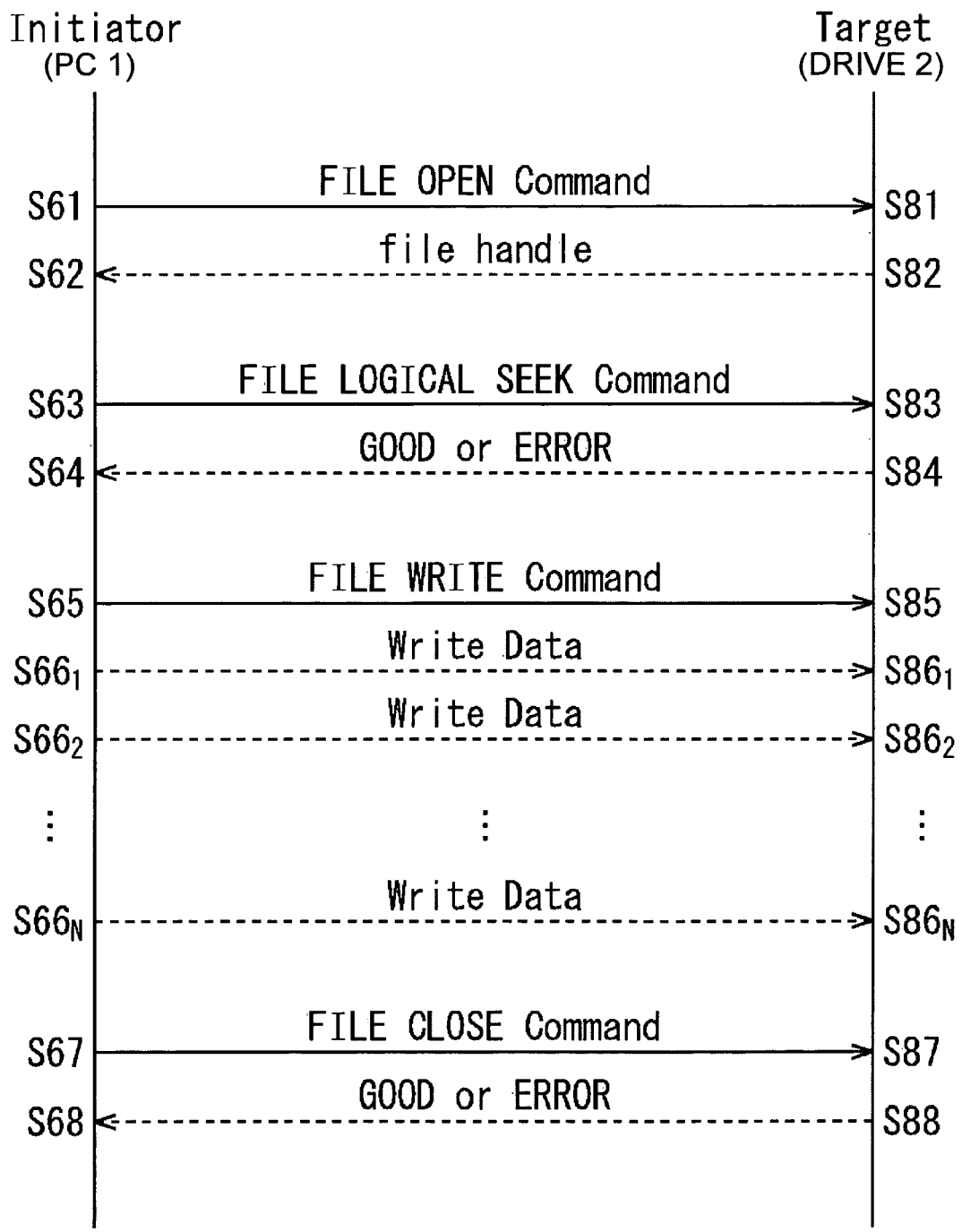
FIG. 12 is a flowchart illustrating a file recording sequence based on PD-SBP2.

Next, a PD-SBP2 protocol file write sequence is described below with reference to the flowchart shown in FIG. 12.

When, in the application 31 (FIG. 4) of the PC 1, data is recorded on the drive 2 in the optical disc 3, the SBP2 driver 56 in the PC 1 serves as the initiator and the drive 2 serves as the target.

In step S61, (the SBP2 driver 56 of) the PC 1 as the initiator transmits command FILE OPEN to the drive 2 as the target. In step S81, the drive 2 receives the transmitted command FILE OPEN and proceeds to step S82.

In step S82, the drive 2 opens a file designated by command FILE OPEN from the PC 1 and sends back its file handle to the PC 1.

In step S62, the PC 1 receives the file handle from the drive 2. Proceeding to step S63, the PC 1 transmits, to the drive 2, command FILE LOGICAL SEEK requesting movement of the file pointer of the file specified by the file handle to a leading position for data recording.

In step S83, the drive 2 receives the command FILE LOGICAL SEEK transmitted from the PC 1. The drive 2 also moves the file pointer of the file opened in step S82 to a position designated by the command FILE LOGICAL SEEK from the PC 1.

Proceeding from step S83 to S84, if the drive 2 has succeeded in moving the file pointer, it sends back success response GOOD to the PC 1. If the drive 2 has failed in moving the file pointer, the drive 2 sends back failure response ERROR to the PC 1.

In step S64, the PC 1 receives the response from the drive 2. If the response from the drive 2 is ERROR which indicates that the drive 2 has failed in moving the file pointer, it performs, for example, finishing the process.

If the response from the drive 2 is GOOD which indicates that it has succeeded in moving the file pointer, the PC 1 proceeds from step S64 to S65 and transmits, to the drive 2, command FILE WRITE for requesting recording of data.

In addition, sequentially proceeding to a set of steps S66.sub.1 to S66.sub.N, the PC 1 transmits, to the drive 2, data to be recorded.

The maximum size of data that can be transmitted from the PC 1 to the drive 2 at a time is limited. Accordingly, when the size of data to be recorded by the PC 1 is greater than the maximum size of data that can be transmitted at a time, the PC 1 divides the data to be recorded into, for example, portions which each have the maximum of data that can be transmitted at a time, and transmits each portion. In the embodiment shown in FIG. 13, the data is transmitted N times from steps S66.sub.1 to S66.sub.N from the PC 1 to the drive 2.

In step S85, the drive 2 receives the command FILE WRITE transmitted from the PC 1 and sequentially proceeds to a set of steps S86.sub.1 to S86.sub.N. In step S66.sub.1 to S.sup.66N, the drive 2 receives the data transmitted from the PC 1 and sequentially records the data from the position of the file pointer moved in step S83.

After that, proceeding to step S67, the PC 1 transmits, to the drive 2, command FILE CLOSE for requesting closing of the file whose opening is requested by the command FILE OPEN transmitted in step S61.

In step S87, the drive 2 receives command FILE CLOSE from the PC 1, and closes a file designated by command FILE CLOSE.

Further proceeding from step S87 to step S88, if the drive 2 has succeeded in closing the file, it sends back success response GOOD to the PC 1. If the drive 2 has failed in closing the file, it sends back failure response ERROR to the PC 1.

As described above, the SBP2 driver 56 (FIG. 4, FIG. 6) converts the SCSI code (SCSI command) from the PD storage 55 into the SCSI command block ORB (SBP2 data) shown in FIG. 8 in which a PD-SBP2 command (extended command) as shown in FIG. 10 is disposed in the cbd [0] field.

In addition, as described above, the IRP supplied from the PD_FS 54 through the NT I/O manager 52, which is a device driver in a layer above the PD_FS 54, is converted into a SCSI code and is output to the SBP2 driver 56 by the PD storage 55.

Accordingly, the IRP output by the PD_FS 54 is converted into a SCSI code and is output to the SBP2 driver 56 by the PD storage 55. In addition, the SCSI code from the PD storage 55 is converted into SBP2 data (SCSI command block ORB) by the SBP2 driver 56.

In other words, the SBP2 driver 56 converts the SCSI code output by the PD storage 55 into the SBP2 data, which is disposed in the cbd [0] field in the SCSI command block ORB shown in FIG. 8.

In PD-SBP2, in the cbd [0] field in the SCSI command block ORB shown in FIG. 8, an extended command as shown in FIG. 10 is disposed. Accordingly, the SCSI code output by the PD storage 55 is one of the extended commands shown in FIG. 10, and is, so to speak, a special SCSI code. Accordingly, the IRP output by the PD_FS 54 through the NT I/O manager 52 needs to be a special IRP which is to be converted into a special SCSI code by the PD storage 55.

In addition, when API functions for file operation, provided to the application 31 by the Win32 subsystem 51 (FIG. 4), are called, IRPs which are provided by the Win32 subsystem 51 to the PD_FS 54 through the NT I/O manager 52, the FS filter driver 53, and the NT I/O manager 52 are determined beforehand.

In other words, the Win32 subsystem 51 provides the application 31 with, for example, API function CreateFile( ) for opening a file, API function ReadFile( ) for reading data from a file, API function WriteFile( ) for recording data in a file, etc.

When the application 31 calls, for example, API function CreateFile( ) a predetermined IRP of IRP_MJ_CREATE for API function CreateFile( ) is supplied from the NT I/O manager 52 to the PD_FS 54.

Similarly, when the application 31 calls, for example, API function ReadFile( ) or WriteFile( ) a predetermined IRP of IRP_MJ_READ for API function ReadFile( ) and a predetermined IRP of IRP_MJ_WRITE are supplied from the NT I/O manager 52 to the PD_FS 54.

In this case, if the PD_FS 54 uses the NT I/O manager 52 to supply the PD storage 55 with an IRP to be supplied through the NT I/O manager 52, IRPs to be supplied through the NT I/O manager 52, that is, for example, IRPs such as IRP_MJ_CREATE, IRP_MJ_READ, and IRP_MJ_WRITE, are predetermined, so-called "standard IRPs". Thus, in the PD storage 55, the IRPs are converted into SCSI codes corresponding to the IRPs, and SCSI codes (SCSI codes that are not special) that are not extended commands.

Accordingly, the PD_FS 54 converts the IRP supplied through the NT I/O manager 52, whereby a special IRP that is to be converted into a SCSI code (special SCSI code) as an extended command is supplied to the PD storage 55 through the NT I/O manager 52.

As the special IRP, an IRP of IRP_MJ_DEVICE_CONTROL in which a user-defined IOCTL code is designated is used.

FIG. 13 shows user-defined IOCTL codes designated by the IRP of IRP_MJ_DEVICE_CONTROL used as the special IRP which is output by the PD_FS 54 to the PD storage 55 through the NT I/O manager 52.

The IOCTL codes shown in FIG. 13 have one-to-one correspondence with the PD-SBP2 commands (extended commands) shown in FIG. 10 excluding command SETUP.

Specifically, in FIG. 13, IOCTL_PD_FILE_OPEN, IOCTL_PD_FILE_CLOSE, IOCTL_PD_FILE_READ, IOCTL_PD_FILE_WRITE, IOCTL_PD_FILE_LOGICAL_SEEK, IOCTL_PD_SET_EOF, IOCTL_PD_DELETE, IOCTL_PD_RENAME, IOCTL_PD MAKE_DIRECTORY, IOCTL_REMOVE_DIRECTORY, IOCTL_PD_LIST_OPEN, IOCTL_PD_LIST_READ, IOCTL_PD_FORMAT, IOCTL_PD_EJECT, IOCTL_PD_DISC_INFO, and IOCTL_PD_SYSTEM correspond to the commands in FIG. 10, that is, FILE OPEN, FILE CLOSE, FILE READ, FILE WRITE, FILE LOGICAL SEEK, SET EOF, DELETE, RENAME, MAKE DIRECTORY, REMOVE DIRECTORY, LIST OPEN, LIST READ, FORMAT, EJECT, DISC INFO, and SYSTEM, respectively.

When the IRP supplied by the PD_FS 54 through the NT I/O manager 52 is an IRP in which an IOCTL code as shown in FIG. 13 is designated, that is, the IRP of IRP_MJ_DEVICE_CONTROL, the PD storage 55 outputs, to the SBP2 driver 56, an extended command (special SCSI code) corresponding to the IOCTL.

The SBP2 driver 56 converts the extended command corresponding to the IOCTL code from the PD storage 55 into a SCSI command block ORB (SBP2 data) as shown in FIG. 8 in which the extended command is disposed in the cbd[O] field.

Figure 14:
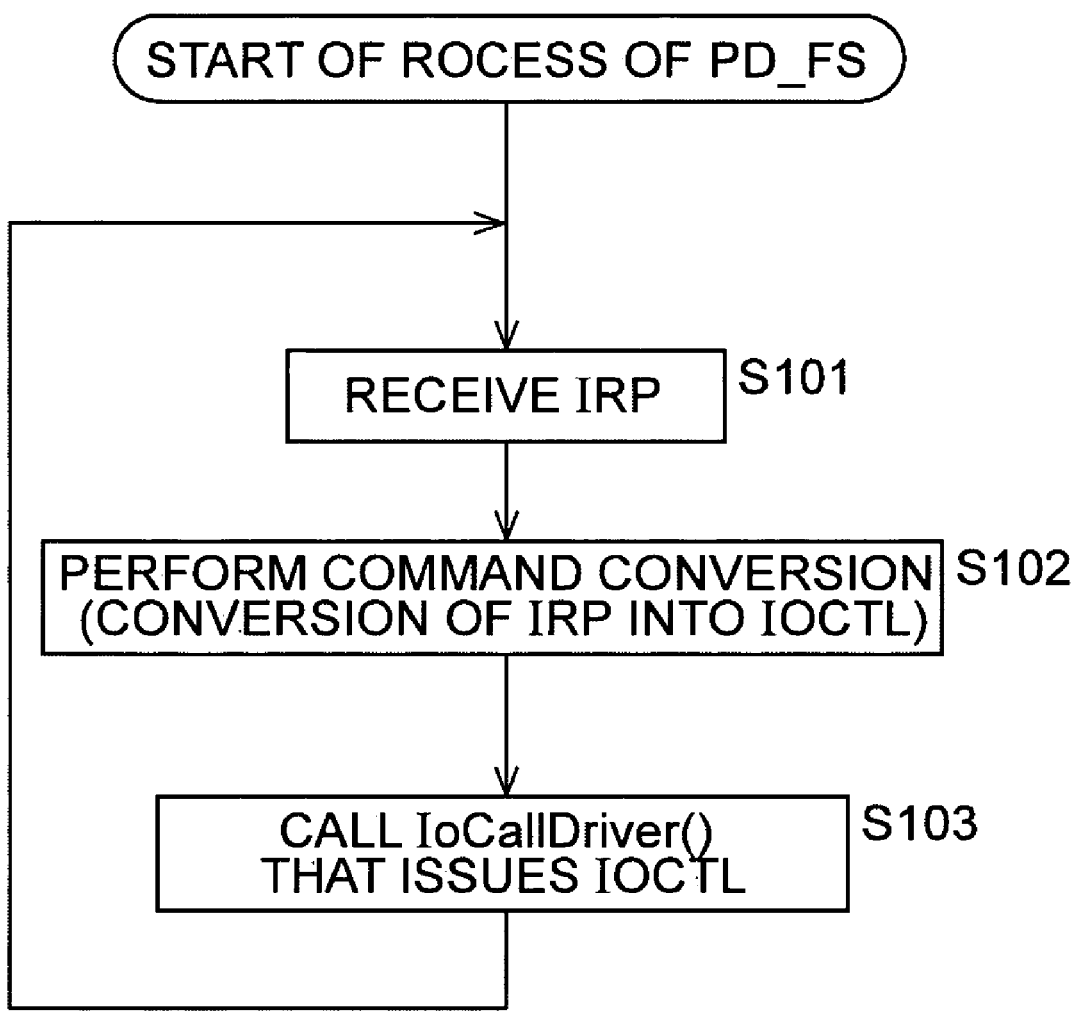
FIG. 14 is a flowchart illustrating the PD_FS shown in each of FIGS. 4 and 6.

Next, IRP processing by the PD_FS 54 in FIG. 6 (FIG. 4) is further described below with reference to the flowchart shown in FIG. 14. For brevity of description, it is assumed that the cache function provided by the NT cache manager 59 (FIG. 4) is not used.

For example, the application 31 calls an API function concerning file operation provided by the Win32 subsystem 51, whereby, when an IRP corresponding to the API function is transmitted to the PD_FS 54 through the Win32 subsystem 51, NT I/O manager 52, FS filter driver 53, and NT I/O manager 52, in step S101, the PD_FS 54 receives the transmitted IRP and proceeds to step S102.

In step S102, the PD_FS 54 converts the IRP received in step S101 into function IoCallDriver( ) that issues an IOCTL code as shown in FIG. 13 which is to be converted into a SBP2 command capable of handling a file system in IEEE 1394 communication.

Function IoCallDrivero has a function similar to that of API function DeviceIoControl( ) provided by the Win32 subsystem 51 when it operates in the user mode. This function is used in the kernel mode.

After that, in step S103, the PD_FS 54 calls the function IoCallDriver( ) obtained in step S102, returns to step S101 after waiting the next IRP to be transmitted, and repeatedly performs similar processing.

As described above, when, in step S103, the PD_FS 54 calls function IoCallDriver( ) the NT I/O manager 52 outputs, to the PD storage 55, an IRP (IRP of IRP_MJ_DEVICE_CONTROL) designated by an IOCTL code issued by the called function IoCallDriver( ). The PD storage 55 outputs, to the SBP2 driver 56, an extended command (FIG. 10) as a special SCSI code corresponding to the IOCTL code (FIG. 13) designated by the IRP.

The SBP2 driver 56 converts the extended command corresponding to the IOCTL code from the PD storage 55 into the SCSI command block ORB (SBP2 data) (FIG. 8) in which the extended command is disposed in the cbd [0] field, and transmits the SCSI command block ORB to the drive 2 through the IEEE 1394 bus driver 57.

As described above, in the PD_FS 54, the IRP that is provided such that the application 31 calls the API function concerning file operation is converted into function IoCallDriver( ) that issues an IOCTL code as shown in FIG. 13 which is to be converted into a PD-SBP2 command (extended command in FIG. 10) capable of handling a file system in IEEE 1394 communication. Thus, by directly using the real file system 61 and the virtual file system 62 in the drive 2, the drive 2 can be easily handled.

In other words, even if the OS 30 or the application 31 does not control unicursal recording, the drive 2 controls unicursal recording. Thus, recording and playback of AV data can be performed in real time.

Moreover, since the application 31 can regard the virtual file system 62 in the drive 2 as mounted on the PC 1, files managed by the virtual file system 62 can be handled similarly to files managed by a common file system such as NTFS or FAT.

The drive 2 as the PD drive is mainly intended to read and record high bit rate AV data in real time. For such a use, what is to be read and recorded is, in general, only one stream.

In other words, although the PD drive can perform simultaneous reading and recording of a plurality of streams, when the streams are read and recorded simultaneously (time-divisionally), properties of unicursal recording cause a seek to occur in the case of changing a stream to be read and recorded, and the seek hinders a real-time characteristic. Therefore, in order to ensure the real-time characteristic, the bit rate of AV data (stream) needs to be reduced.

In addition, in a case in which what is to be read and recorded is set to only one stream, assuming that AV data can be read and recorded in real time at a high bit rate, if what is to be read and recorded is set to M streams, simply stated, real-time reading and recording is difficult unless the streams have a bit rate equal to or less than 1/M compared with the case of only one stream to be read and recorded. Therefore, streams capable of being read and recorded are AV data of low image quality or low sound quality.

From the foregoing description, in order to perform reading and recording of high bit rate AV data in real time, it is preferable that the number of AV data streams to be read from or recorded on the drive 2 be limited to one. This limitation can be realized by, for example, controlling the drive 2 to handle only one file handle.

In addition, according to a general-purpose OS for computer, in general, a plurality of files can be opened.

Accordingly, when the drive 2 is connected to the PC 1, it is preferable for the application 31 to open a plurality of files on the optical disc 3 loaded into the drive 2, and it is preferable that the opened files can be operated.

Accordingly, when the drive 2 uses only one file handle, the PD_FS 54 can be provided with a function (hereinafter referred to as "plural files simultaneous opening function", if necessary) enabling the application 31 to apparently open a plurality of files.

Figure 15:
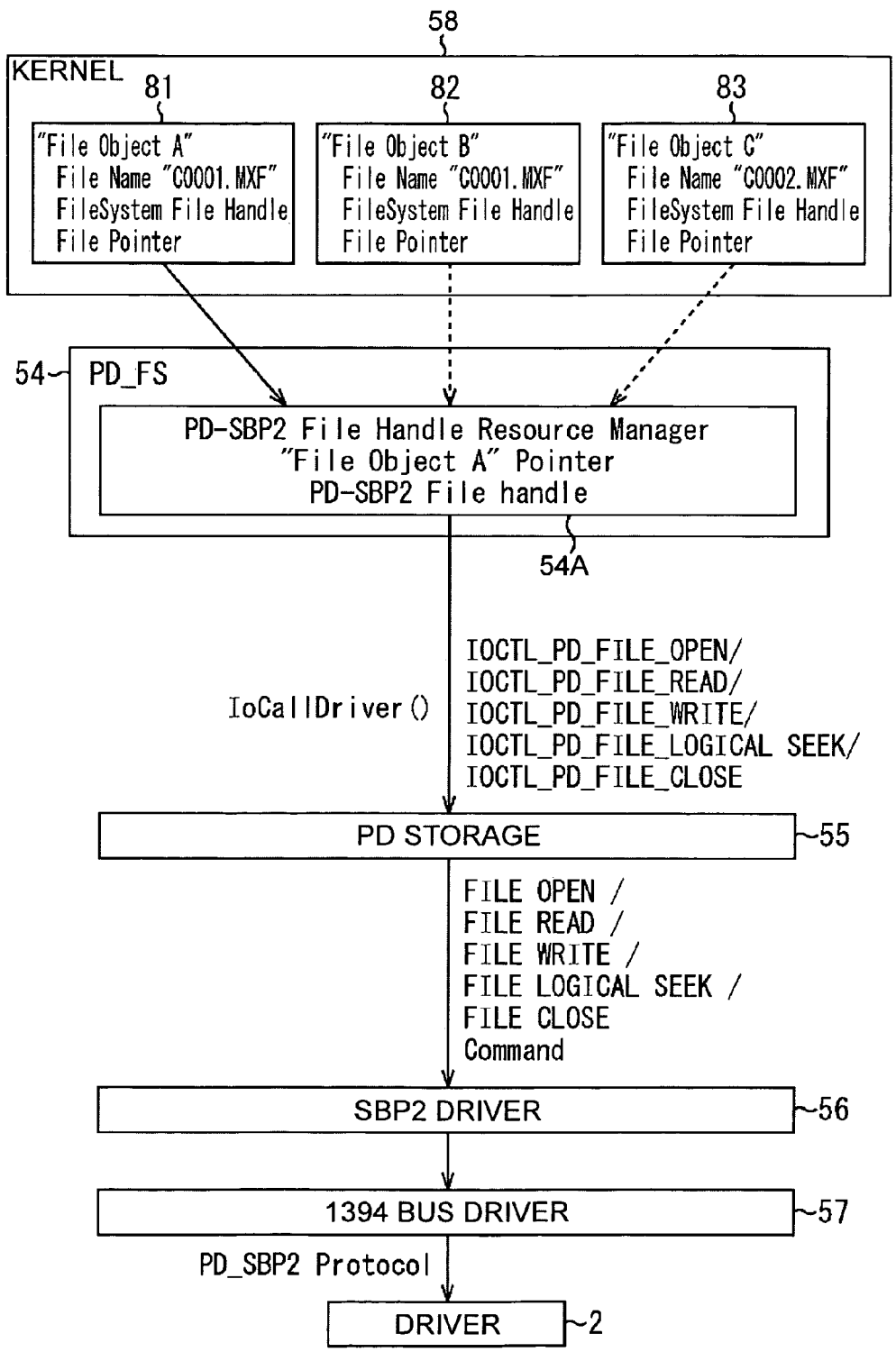
FIG. 15 is a block diagram illustrating a plural files simultaneous opening function.

FIG. 15 is a block diagram illustrating the plural files simultaneous opening function.

Specifically, FIG. 15 is a schematic illustration of the state of the kernel 58 when the application 31 opens files a plurality of times.

When the application 31 opens files, in the kernel 58, file objects corresponding to the opening of the files are created.

In FIG. 15, three file objects 81, 82, and 83 are created in the kernel 58.

The file object 81 is created such that the application 31 calls API function CreateFile( ) and opens, for example, file C0001.MXF (shown on the left side of FIG. 7) managed by the virtual file system 62.

Similarly to the file object 81, the file object 82 is created such that the application 31 calls API function CreateFile( ) and opens, for example, file C0001.MXF (shown on the left side of FIG. 7) managed by the virtual file system 62.

The file object 83 is created such that the application 31 calls API function CreateFile( ) and opens, for example, file C0002.MXF (shown on the left side of FIG. 7) managed by the virtual file system 62.

Accordingly, in FIG. 15, the application 31 calls API function CreateFile( ) twice for opening file C0001.MXF and calls API function CreateFile( ) once for opening file C0002.MXF, whereby the three file objects 81 to 83 are created in the kernel 58.

Each of the file objects 81 to 83 has a file name, file handle (file system file handle), and file pointer of a corresponding file.

The plural files simultaneous opening function is provided by the file handle resource manager 54A in the PD_FS 54.

In other words, the file handles, sent back from the drive 2, have resource characteristics, that is, properties in which it is difficult for plural file handles to be valid (it is difficult for plural file handles to be used).

Accordingly, the file handle resource manager 54A exclusively controls accessing of the file handles sent back from the drive 2 by the file objects created in the file object 81. The exclusive control may be performed by an arbitrary method such as a semaphore method.

In other words, the file handle resource manager 54A stores the file handles (hereinafter referred to as "PD-SBP2 file handles") sent back in PD-SBP2 from the drive 2 and pointers to the file objects, which use the SBP2 file handles.

When the application 31 calls one of API function FileCreate( ) that requests opening of a file different from a file specified by a presently stored SBP2 file handle, API function ReadFile( ) that requests reading of data, and API function WriteFile( ) that requests recording of data, the file handle resource manager 54A closes the file specified by the presently stored PD-SBP2 file handle.

In addition, by using the application 31 to call an API function, the file handle resource manager 54A requests the drive 2 to open a file from which reading or recording of data is requested. The file handle resource manager 54A newly stores a PD-SBP2 file handle send back by the drive 2 in response to the request instead of the PD-SBP2 file handle that has been stored. The file handle resource manager 54A also stores a pointer to a file object which uses the newly stored PD-SBP2 file handle instead of the pointer that has been stored.

By using (the file handle resource manager 54A of) the above plural files simultaneous opening function by the PD_FS 54, the application 31 can (apparently) simultaneously open files.

Next, the plural files simultaneous opening function is further described below with reference to the flowchart shown in FIG. 16. For brevity of description, it is assumed that cache function provided by the NT cache manager 59 (FIG. 4) is not used.

For example, when, in step Sill, the application 31 calls API function CreateFile( ) for requesting opening of File A, the Win32 subsystem 51 (FIG. 4) outputs, to the NT I/O manager 52, a request in response to the call, and the NT I/O manager 52 outputs, to the PD_FS 54, API function CreateFile( ) for requesting opening File A in response to the request from the Win32 subsystem 51.

In step S131, (the file handle resource manager 54A of) the PD_FS 54 receives "IRP_MJ_CREATE" which requests opening of File A and which is supplied such that the application 31 calls the API function in step Sill, and proceeds to step S132. In step S132, (the file handle resource manager 54A of) the PD_FS 54 calls function IoCallDrivero for issuing IOCTL_PD_FILE_OPEN (FIG. 13), which is an IOCTL code for requesting opening of File A.

In response to the calling of function IoCallDriver( ) in step S132 by the PD_FS 54, the NT I/O manager 52 supplies the PD storage 55 with (an IRP of) IRP_MJ_DEVICE_CONTROL in which IOCTL_PD_FILE_OPEN is designated.

In step S171, the PD storage 55 receives IRP_MJ_DEVICE_CONTROL in which IOCTL_PD_FILE_OPEN is designated and which is supplied such that the PD_FS 54 calls function IoCallDriver( ) in step S132, and outputs, to the drive 2, through the SBP2 driver 56 and the IEEE 1394 bus driver 57, extended command FILE OPEN (FIG. 10) corresponding to the IRP_MJ_DEVICE_CONTROL.

This allows the drive 2 to open File A (File A that is shown to the exterior by the virtual file system 62) on the optical disc 3.

After that, for example, when, in step S112, the application 31 calls API function ReadFile( ) that requests reading of data from File A, the Win32 subsystem 51 outputs, to the NT I/O manager 52, a request in response to the call, and, in response to the request from the Win32 subsystem 51, the NT I/O manager 52 outputs, to the PD_FS 54, (an IRP of) IRP_MJ_READ corresponding to API function ReadFile( ) that requests reading of data from File A.

In step S133, the PD_FS 54 receives IRP_MJ_READ which requests reading of data from File A and which is supplied such that the application 31 calls the API function in step S112, and proceeds to step S134. In step S134, in response to IRP_MJ_READ, the PD_FS 54 calls function IoCallDriver( ) that issues IOCTL_PD_FILE_READ (FIG. 13) which is an IOCTL code for requesting reading of data from File A.

In response to the calling of function IoCallDrivero in step S134 by the PD_FS 54, the NT I/O manager 52 supplies the PD storage 55 with (an IRP of) IRP_MJ_DEVICE_CONTROL in which IOCTL_PD_FILE_READ is designated.

In step S172, the PD storage 55 receives IRP_MJ_DEVICE_CONTROL in which IOCTL_PD_FILE_READ is supplied and which is supplied such that the PD_FS 54 calls function IoCallDriver( ) in step S134, and outputs, to the drive 2, through the SBP2 driver 56 and the IEEE 1394 bus driver 57, extended command FILE READ (FIG. 10) corresponding to IRP_MJ_DEVICE_CONTROL.

This allows the drive 2 to read data from File A on the optical disc 3. The data read in the drive 2 is supplied to the application 31 through the IEEE 1394 bus driver 57, the SBP2 driver 56, the PD_FS 54, and the FS filter driver 53.

The PD storage 55 includes a read/write buffer (not shown) for reading and recording of data. The size of the read/write buffer is equal to, for example, a page size (e.g., 4 kilobytes) in paging, and the maximum size of data that can be read or recorded at a time is limited to the size of the read/write buffer.

Accordingly, when the size of data whose reading is requested by IRP_MJ_READ (IRP_MJ_READ supplied such that the application 31 calls API function ReadFile( )) from the application 31 exceeds the size of the read/write buffer, the PD_FS 54 divides IRP_MJ_READ from the application 31 into a plurality of IRPs "IRP_MJ_DEVICE_CONTROL" which request reading of data whose size is not greater than the size of the read/write buffer, and outputs the divided IRPs to the PD storage 55. In other words, the PD_FS 54 calls, a plurality of times, function IoCallDriver( ) that issues IOCTL_PD_FILE_READ for requesting reading of data whose size is not greater than the size of the read/write buffer. This supplies the PD storage 55' with a plurality of IRPs IRP_MJ_DEVICE_CONTROL in each of which IOCTL_PD_FILE_READ is designated.

This also applies to IRP_MJ_WRITE from the application 31 that requests recording of data in a file.

Figure 16:
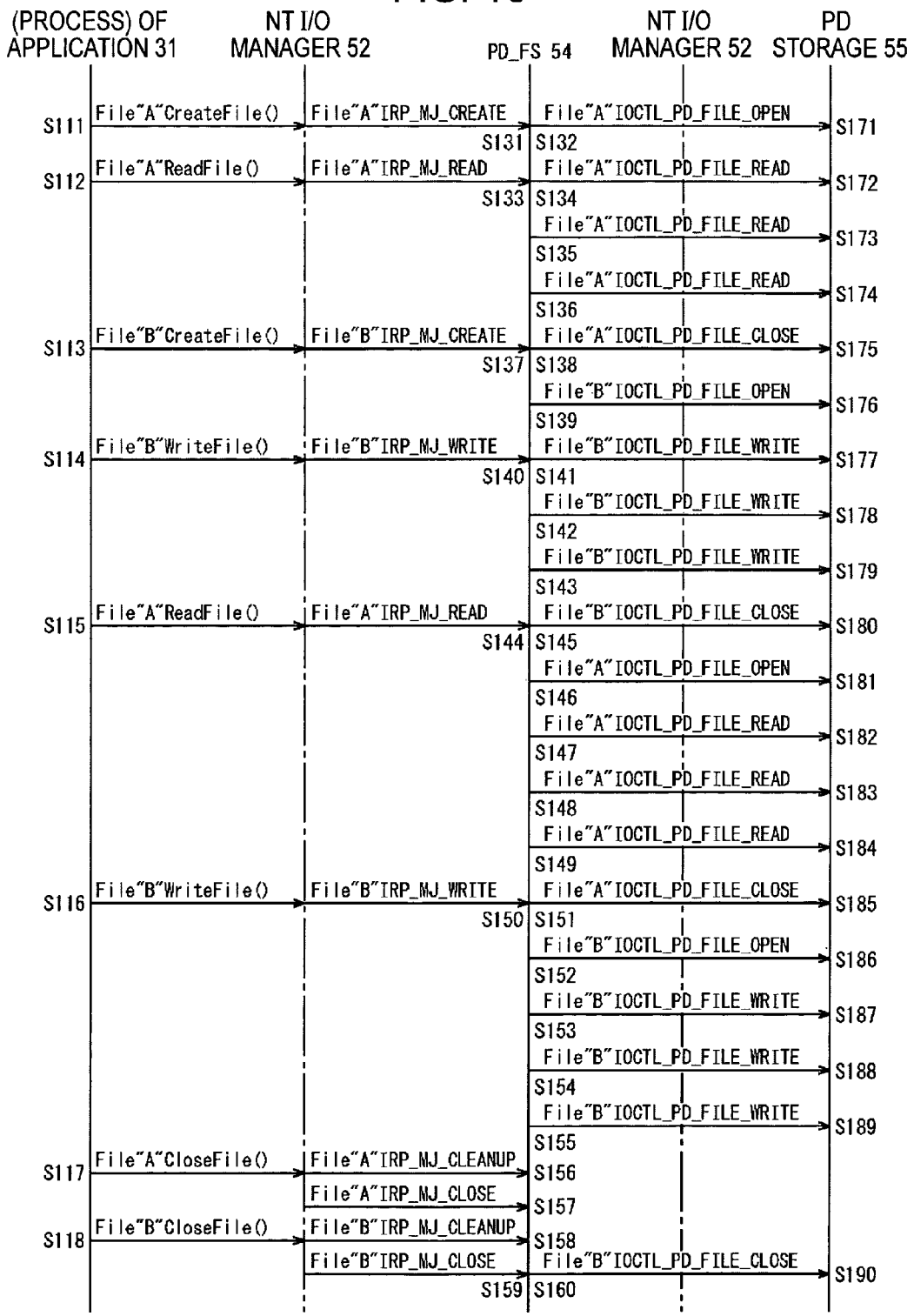
FIG. 16 is a flowchart illustrating the plural files simultaneous opening function illustrated in FIG. 15.

In FIG. 16, in response to the IRP_MJ_READ by the PD_FS 54 in step S133, in each of steps S134 to S136, IRP_MJ_DEVICE_CONTROL in which IOCTL_PD_FILE_READ for requesting reading data from File A is designated is output to the PD storage 55. In other words, IOCTL_PD_FILE_READ is output from the PD_FS 54 to the PD storage 55 three times.

In each of steps S172 to S174, by receiving IRP_MJ_DEVICE_CONTROL in which IOCTL_PD_FILE_READ is designated and which is output by the PD_FS 54 in each of steps S134 to S136, and outputting extended command FILE READ, which corresponds to IRP_MJ_DEVICE_CONTROL, to the drive 2 through the SBP2 driver 56 and the IEEE 1394 bus driver 57, the PD storage 55 reads data from File A three times.

After that, when, in step S113, the application 31 calls the API function that requests opening of File B different from File A, which is presently opened in the drive 2, similarly to the case in step S111, IRP_MJ_CREATE corresponding to API function CreateFile( ) that requests opening of File B is supplied to the PD_FS 54.

In step S137, the PD_FS 54 receives IRP_MJ_CREATE (IRP_MJ_CREATE which requests opening of File B and which is supplied such that the application 31 calls API function CreateFile( ) from the application 31, and proceeds to step S138, and calls function IoCallDrivero that issues IOCTL_PD_FILE_CLOSE (FIG. 13), which is an IOCTL code for requesting closing of File A.

In other words, as described above, the number of file handles that can be used by the drive 2 is only one. Thus, before requesting opening of File B, the PD_FS 54 requests closing of File A, which is presently opened.

In response to the calling of function IoCallDrivero by the PD_FS 54 in step S138, the NT I/O manager 52 supplies the PD storage 55 with IRP_MJ_DEVICE_CONTROL in which IOCTL_PD_FILE_CLOSE is designated.

In step S175, the PD storage 55 receives IRP_MJ_DEVICE_CONTROL in which IOCTL_PD_FILE_CLOSE is designated and which is supplied such that the PD_FS 54 calls function IoCallDriver( ) in step S138, and outputs extended command FILE CLOSE corresponding to IRP_MJ_DEVICE_CONTROL to the drive 2 through the SBP2 driver 56 and the IEEE 1394 bus driver 57.

This allows the drive 2 to close File A on the optical disc 3.

By proceeding to step S139 after performing step S138, and calling function IoCallDriver( ) that requests IOCTL_PD_FILE_OPEN (FIG. 13), which is an IOCTL code for requesting opening of File B, in response to IRP_MJ_CREATE which is received in step S137 and which requests opening of File B, the PD_FS 54 supplies the PD storage 55 with IRP_MJ_DEVICE_CONTROL in which IOCTL_PD_FILE_OPEN is designated.

In step S176, the PD storage 55 receives IRP_MJ_DEVICE_CONTROL from the PD_FS 54, that is, IRP_MJ_DEVICE_CONTROL in which IOCTL_PD_FILE_OPEN is designated and which is supplied such that the PD_FS 54 calls function IoCallDrivero, and outputs extended command FILE OPEN (FIG. 10) corresponding to IRP_MJ_DEVICE_CONTROL to the drive 2 through the SBP2 driver 56 and the IEEE 1394 bus driver 57.

This allows the drive 2 to open File B (File B shown to the exterior by the virtual file system 62) on the optical disc 3.

After that, for example, when, in step S114, the application 31 calls API function WriteFile( ) that requests recording of data in File B, the Win32 subsystem 51 outputs a request in response to the call to the NT I/O manager 52, and, in response to the request from the Win32 subsystem 51, the NT I/O manager 52 outputs, to the PD_FS 54, IRP_MJ_WRITE corresponding to API function WriteFile( ) which requests recording of data in File B.

In step S140, the PD_FS 54 receives IRP_MJ_WRITE which requests recording of data in File B and which is supplied such the application 31 calls the API function in step S114, and proceeds to step S141. In step S141, in response to IRP_MJ_WRITE, the PD_FS 54 calls function IoCallDriver( ) for issuing IOCTL_PD_FILE_WRITE (FIG. 13) which is an IOCTL code for requesting recording of data in File B.

In response to the calling of function IoCallDriver( ) in step S141 by the PD_FS 54, the NT I/O manager 52 supplies the PD storage 55 with IRP_MJ_DEVICE_CONTROL in which IOCTL_PD_FILE_WRITE is designated.

In step S177, the PD storage 55 receives IRP_MJ_DEVICE_CONTROL in which IOCTL_PD_FILE_WRITE is designated and which is supplied such that the PD_FS 54 calls function IoCallDriver( ) in step S141, and outputs extended command FILE WRITE corresponding to IRP_MJ_DEVICE_CONTROL to the drive 2 through the SBP2 driver 56 and the IEEE 1394 bus driver 57.

This allows the drive 2 to record data in File B on the optical disc 3.

As described above, the maximum size of data that can be read or recorded at a time is limited to the size of the read/write buffer in the PD storage 55.

Accordingly, when the size of data whose recording is requested by IRP_MJ_WRITE (IRP_MJ_WRITE supplied such that the application 31 calls an API function) from the application 31 exceeds the size of the read/write buffer, the PD_FS 54 divides IRP_MJ_WRITE from the application 31 into a plurality of IRPs IRP_MJ_DEVICE_CONTROL which request recording of data whose size is not greater than the size of the read/write buffer, and outputs the IRPs to the PD storage 55. In other words, in response to IRP_MJ_WRITE from the application 31, the PD_FS 54 calls, a plurality of times, function IoCallDriver( ) that issues IOCTL_PD_FILE_WRITE for requesting recording of data whose size is not greater than the size of the read/write buffer, whereby the PD storage 55 is supplied with the IRPs IRP_MJ_DEVICE_CONTROL in each of which IOCTL_PD_FILE_WRITE is designated.

In FIG. 16, in response to the IRP_MJ_WRITE received by the PD_FS 54 in step S140, in each of steps S141 to S143, IRP_MJ_DEVICE_CONTROL in which IOCTL_PD_FILE_WRITE for requesting recording of data in File B is designated is output to the PD storage 55. In other words, IOCTL_PD_FILE_WRITE is output from the PD_FS 54 to the PD storage 55 three times.

The PD storage 55 records data in File B three times by, in each of steps S177 to S179, receiving IRP_MJ_DEVICE_CONTROL in which IOCTL_PD_FILE_WRITE is designated and which is output by the PD_FS 54 in each of steps S141 to S143, and outputting extended command FILE READ corresponding to the IRP_MJ_DEVICE_CONTROL to the drive 2 through the SBP2 driver 56 and the IEEE 1394 bus driver 57.

After that, when, in step S115, the application 31 calls API function ReadFile( ) that requests reading of File A different File B, which is presently opened in the drive 2, similarly to the case in step S112, the PD_FS 54 is supplied with IRP_MJ_READ corresponding to API function ReadFile( ) for requesting reading of data from File A.

In step S144, the PD_FS 54 receives IRP_MJ_READ (IRP_MJ_READ which requests reading of data from File A and which is supplied such that the application 31 calls allocation flag ReadFile( )) from the application 31 and proceeds to step S145. In step S145, in response to the received IRP_MJ_READ, the PD_FS 54 calls function IoCallDriver( ) for issuing IOCTL_PD_FILE_CLOSE (FIG. 13) which is an IOCTL code for requesting closing of File B.

In other words, as described above, the number of file handles that can be used by the drive 2 is only one. Thus, before requesting reading of data from File A, the PD_FS 54 requests closing of File B, which is presently opened.

In response to the calling of function IoCallDriver( ) by the PD_FS 54 in step S145, the NT I/O manager 52 supplies the PD storage 55 with IRP_MJ_DEVICE_CONTROL in which IOCTL_PD_FILE_CLOSE for requesting closing of File B is designated.

In step S180, the PD storage 55 receives IRP_MJ_DEVICE_CONTROL in which IOCTL_PD_FILE_CLOSE is designated and which is supplied such that the PD_FS 54 calls function IoCallDriver( ) in step S145, and outputs extended command FILE CLOSE (FIG. 10) corresponding to IRP_MJ_DEVICE_CONTROL to the drive 2 through the SBP2 driver 56 and the IEEE 1394 bus driver 57.

This allows the drive 2 to close File B on the optical disc 3.

Proceeding to step S146 after performing step S145, in response to IRP_MJ_READ which requests reading of data from File A and which is received in step S144, the PD_FS 54 calls function IoCallDriver( ) that issues IOCTL_PD_FILE_OPEN (FIG. 13) which is an IOCTL code for requesting opening of File A.

In other words, since File A is presently closed such that, in step S175, the PD storage 55 outputs, to the drive 2, extended command FILE CLOSE (FIG. 10) for requesting closing of File A, in order to read data from File A, the PD_FS 54 calls function IoCallDriver( ) that issues IOCTL_PD_FILE_OPEN which is an IOCTL code for requesting opening of File A.

In response to the calling of function IoCallDrivero by the PD_FS 54 in step S146, the NT I/O manager 52 supplies the PD storage 55 with IRP_MJ_DEVICE_CONTROL in which IOCTL_PD_FILE_OPEN for requesting opening of File A is designated.

In step S181, the PD storage 55 receives IRP_MJ_DEVICE_CONTROL in which IOCTL_PD_FILE_OPEN is designated and which is supplied such that the PD_FS 54 calls function IoCallDriver( ), and outputs extended command FILE OPEN (FIG. 10) corresponding to IRP_MJ_DEVICE_CONTROL to the drive 2 through the SBP2 driver 56 and the IEEE 1394 bus driver 57.

This allows the drive 2 to open File A on the optical disc 3.

By proceeding to step S147 after performing step S146, and, in response to the IRP_MJ_READ which requests reading of data from File A and which is received in step S144, and calling IoCallDrivero that issues IOCTL_PD_FILE_READ (FIG. 13) which is an IOCTL code for requesting reading of data from File A, the PD_FS 54 supplies the PD storage 55 with IRP_MJ_DEVICE_CONTROL in which the issued IOCTL_PD_FILE_READ is designated.

In step S182, the PD storage 55 receives IRP_MJ_DEVICE_CONTROL in which IOCTL_PD_FILE_READ is designated and which is supplied from the PD_FS 54, and outputs extended command FILE READ (FIG. 10) corresponding to the received IRP_MJ_DEVICE_CONTROL to the drive 2 through the SBP2 driver 56 and the IEEE 1394 bus driver 57.

This allows the drive 2 to read data from File A on the optical disc 3. The data read from the drive 2 is supplied to the application 31 through the IEEE 1394 bus driver 57, the SBP2 driver 56, the PD storage 55, and the FS filter driver 53.

Based on the limitation in reading and recording by the size of the read/write buffer in the above PD storage 55, in FIG. 16, in response to the IRP_MJ_READ received by the PD_FS 54 in step S144, in each of steps S147 to S149, IRP_MJ_DEVICE_CONTROL in which IOCTL_PD_FILE_READ for requesting reading of data from File A is designated is output to the PD storage 55. In other words, IOCTL_PD_FILE_READ is output from the PD_FS 54 to the PD storage 55 three times.

The PD storage 55 reads data from File A three times by, in each of steps S182 to S184, receiving IRP_MJ_DEVICE_CONTROL in which IOCTL_PD_FILE_READ is designated and which is output by the PD_FS 54 in each of steps S147 to S149, and outputting extended command FILE READ corresponding to IRP_MJ_DEVICE_CONTROL to the drive 2 through the SBP2 driver 56 and the IEEE 1394 bus driver 57.

After that, when, in step S116, the application 31 calls API function WriteFile( ) that requests recording of data in File B different from File A, which is presently opened in the drive 2, similarly to the case in step S114, IRP_MJ_WRITE corresponding to API function WriteFile( ) for requesting recording of data in File B is supplied to the PD_FS 54.

In step S150, the PD_FS 54 receives IRP_MJ_WRITE (IRP_MJ_WRITE which requests recording of data in File B and which is supplied such that the application 31 calls API function WriteFile( ) from the application 31 and proceeds to step S151. In step S151, in response to the received IRP_MJ_WRITE, the PD_FS 54 calls function IoCallDriver( ) that issues IOCTL_PD_FILE_CLOSE (FIG. 13) which is an IOCTL code for requesting closing of File A.

In other words, as described above, the number of file handles that can be used by the drive 2 is only one. Thus, before requesting recording of data in File B, the PD_FS 54 requests closing of File A, which is presently opened.

In response to the calling of function IoCallDrivero by the PD_FS 54 in step S151, the NT I/O manager 52 supplies the PD storage 55 with IRP_MJ_DEVICE_CONTROL in which IOCTL_PD_FILE_CLOSE for requesting closing of File A is designated.

In step S185, the PD storage 55 receives IRP_MJ_DEVICE_CONTROL in which IOCTL_PD_FILE_CLOSE is designated and which is supplied such that the PD_FS 54 calls function IoCallDriver( ) in step S151, and outputs extended command FILE CLOSE (FIG. 10) corresponding to IRP_MJ_DEVICE_CONTROL to the drive 2 through the SBP2 driver 56 and the IEEE 1394 bus driver 57.

This allows the drive 2 to close File A on the optical disc 3.

Proceeding to step S152 after performing step S151, in response to IRP_MJ_WRITE which requests recording of data in File B and which is received in step S150, the PD_FS 54 calls function IoCallDriver( ) that issues IOCTL_PD_FILE_OPEN (FIG. 13) which is an IOCTL code for requesting opening of File B.

In other words, in the above step S180, the PD storage 55 outputs, to the drive 2, extended command FILE CLOSE (FIG. 10) that requests closing of File B, whereby File B is presently closed. Thus, in order to record data in File B, the PD_FS 54 calls function IoCallDriver( ) that issues IOCTL_PD_FILE_OPEN which is an IOCTL code for requesting opening of File B.

In response to the calling of function IoCallDriver( ) by the PD_FS 54 in step S152, the NT I/O manager 52 supplies the PD storage 55 with IRP_MJ_DEVICE_CONTROL in which IOCTL_PD_FILE_OPEN is designated.

In step S186, the PD storage 55 receives IRP_MJ_DEVICE_CONTROL in which IOCTL_PD_FILE_OPEN is designated and which is supplied such that PD_FS 54 calls function IoCallDriver( ) in step S152, and outputs extended command FILE OPEN (FIG. 10) corresponding to IRP_MJ_DEVICE_CONTROL to the drive 2 through the SBP2 driver 56 and the IEEE 1394 bus driver 57.

This allows the drive 2 to open File B on the optical disc 3.

Proceeding to step S153 after performing step S152, in response to IRP_MJ_WRITE which requests recording of data in File B and which is received in step S151, the PD_FS 54 calls function IoCallDriver( ) that issues IOCTL_PD_FILE_WRITE (FIG. 13) which is an IOCTL code for requesting recording of data in File B, whereby IRP_MJ_DEVICE_CONTROL in which IOCTL_PD_FILE_WRITE is designated is supplied to the PD storage 55.

In step S187, the PD storage 55 receives IRP_MJ_DEVICE_CONTROL in which IOCTL_PD_FILE_WRITE is designated and which is supplied from the PD_FS 54, and outputs extended command FILE WRITE (FIG. 10) corresponding to IRP_MJ_DEVICE_CONTROL to the drive 2 through the SBP2 driver 56 and the IEEE 1394 bus driver 57.

This allows the drive 2 to record data in File B on the optical disc 3.

Based on the limitation in reading and recording by the size of the read/write buffer in the above PD storage 55, in FIG. 16, in response to the IRP_MJ_READ received by the PD_FS 54 in step S150, in each of steps S153 to S155, IRP_MJ_DEVICE_CONTROL in which IOCTL_PD_FILE_WRITE for requesting recording of data in File B is designated is output to the PD storage 55. In other words, IOCTL_PD_FILE_WRITE is output from the PD_FS 54 to the PD storage 55 three times.

The PD storage 55 records data in File B three times by, in each of steps S187 to S189, receiving IRP_MJ_DEVICE_CONTROL in which IOCTL_PD_FILE_WRITE is designated and which is output by the PD_FS 54 in each of steps S153 to S155, and outputting extended command FILE WRITE corresponding to IRP_MJ_DEVICE_CONTROL to the drive 2 through the SBP2 driver 56 and the IEEE 1394 bus driver 57.

After that, when, in step S117, the application 31 calls API function CreateFile( ) for requesting closing of File A, the Win32 subsystem 51 (FIG. 4) outputs a request in response to the call to the NT I/O manager 52, and the NT I/O manager 52 outputs, to the PD_FS 54, in response to the request from the Win32 subsystem 51, IRP_MJ_CLEANUP that requests cleanup of File A, and IRP_MJ_CLOSE corresponding to API function CreateFile( ) that requests closing of File A.

In steps S156 and S157, the PD_FS 54 receives IRP_MJ_CLEANUP which requests cleanup of File A and which is supplied such that the application 31 calls the API function, and IRP_MJ_CLOSE which requests closing of File A, respectively.

In response to IRP_MJ_CLEANUP which requests cleanup of File A, the PD_FS 54 performs cleanup processing such as flushing of data cached by the cache function provided by the NT cache manager 59 (FIG. 4). In addition, the PD_FS 54 determines whether File A, whose closing is requested by IRP_MJ_CLOSE, is opened. For example, it is determined whether an file object that uses a PD-SBP2 file handle as described with reference to FIG. 15 serves as a file object of File A.

Since, in FIG. 16, File A is presently closed such that, in step S185, the PD storage 55 outputs, to the drive 2, extended command FILE CLOSE for requesting closing of File A, the PD_FS 54 determines that File A, whose closing is requested by IRP_MJ_CLOSE, has already been closed. In this case, the PD_FS 54 does not particularly perform processing on IRP_MJ_CLOSE for requesting closing of File A.

When, in step S118, the application 31 calls allocation flag CloseFile( ) that requests closing of File B, the Win32 subsystem 51 (FIG. 4) outputs, to the PD_FS 54, a request in response to the call, and the NT I/O manager 52 outputs, to the PD_FS 54, in response to the request from the Win32 subsystem 51, IRP_MJ_CLEANUP that requests cleanup of File B, and IRP_MJ_CLOSE corresponding to API function CloseFile( ) that requests closing of File B.

In steps S158 and 5159, the PD_FS 54 receives IRP_MJ_CLEANUP which requests cleanup of File B and which is supplied such that the application 31 calls the API function in step S118, and IRP_MJ_CLOSE which requests closing of File B, respectively.

In response to IRP_MJ_CLEANUP which requests cleanup of File B, the PD_FS 54 performs, for example, the cleanup processing as described above. The PD_FS 54 determines whether File B, whose closing is requested by IRP_MJ_CLOSE, is opened.

In FIG. 16, File B is presently opened such that, in step S186, the PD storage 55 outputs, to the drive 2, extended command FILE OPEN (FIG. 10) which requests opening of File B. Thus, the PD_FS 54 determines that File B, whose closing is requested by IRP_MJ_CLOSE, is presently opened.

In this case, proceeding to step S160 in response to IRP_MJ_CLOSE which requests closing of File B and which is received in step S159, in response to IRP_MJ_CLOSE, the PD_FS 54 calls function IoCallDriver( ) that issues IOCTL_PD_FILE_CLOSE (FIG. 13) which is an IOCTL code for requesting closing of File B.

In response to the calling of function IoCallDriver( ) by the PD_FS 54 in step S160, the NT I/O manager 52 supplies the PD storage 55 with IRP_MJ_DEVICE_CONTROL in which IOCTL_PD_FILE_CLOSE for requesting closing of File B is designated.

In step S190, the PD storage 55 receives IRP_MJ_DEVICE_CONTROL in which IOCTL_PD_FILE_CLOSE is designated and which is supplied such that PD_FS 54 calls function IoCallDriver( ) in step S160, and outputs extended command FILE CLOSE corresponding to IRP_MJ_DEVICE_CONTROL to the drive 2 through the SBP2 driver 56 and the IEEE 1394 bus driver 57.

This allows the drive 2 to close File B on the optical disc 3.

As described above, according to the plural files simultaneous opening function, when accessing of a file different from a file presently opened in the drive 2 is requested, by using (the file handle resource manager 54A of) the PD_FS 54 to close the presently opened file and to open the file whose accessing is requested, accessing of one file handle used in the drive 2 is exclusively controlled. Thus, the application 31 can perform operations on a plurality of files without particularly considering that drive 2 can use only one file handle.

Although, in this embodiment, an optical disc is employed as a recording medium on which data is recorded and played back, the present invention is applicable to, for example, the case of recording and playing back data on a recording medium such as a hard disk.

In this specification, program steps for controlling the PC 1 to perform various types of processing do not necessarily need to be performed in the order described in flowchart form, and include steps (e.g., steps in parallel processing or object-based processing) which are executed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, including one or more hardware elements, connected to a recording or playback apparatus having a file system, the information processing apparatus comprising:
a receiving unit for receiving a first command,
wherein the first command is provided by an operating system in response to a file operating request from an application; and
a converting unit for converting the first command provided by the operating system into a request,
wherein the request is converted into a second command based on a communication protocol capable of handling the file system in communication with said recording or playback apparatus,
wherein the communication protocol employed in determining the second command that the request is converted to is determined in accordance with handling the file system in a subsequent stage,
wherein the second command accesses a real file system and a virtual file system of the recording or playback device, and
wherein the virtual file system comprises a communication function based on protocol that provides real files managed by the real file system as virtual files managed by the virtual file system to the exterior, and
the virtual file system provides to the exterior, in the form of a single file, a virtual file comprising data from a plurality of different files managed by the real file system,
wherein the virtual file provided to the exterior comprises audio and video files, and
wherein back-up files, disk information files, clip information files, and frame metadata files, each of which are managed by the real file system, are filtered out and excluded from the virtual file provided to the exterior.

2. The information processing apparatus according to claim 1, further comprising an exclusive control unit which, when said recording or playback apparatus uses only one file handle, exclusively controls accessing of said one file handle used in said recording or playback apparatus.

3. The information processing apparatus according to claim 1, wherein the information processing apparatus does not perform file management performed in the file system of said recording or playback apparatus.

4. The information processing apparatus according to claim 1, wherein data which is read from or recorded in a file in said recording or playback apparatus includes at least audiovisual data.

5. The information processing apparatus according to claim 1,
wherein, in said recording or playback apparatus, among consecutive free areas, having a predetermined size or greater, in recording areas of a recording medium, a free area having data recorded in the closest past is reserved and data is recorded in the reserved area.

6. An information processing method for an information processing apparatus connected to a recording or playback apparatus having a file system, the information processing method comprising the steps of:
- receiving a first command provided by an operating system in response to a file operating request from an application; and
- converting the first command provided by the operating system into a request which is to be converted into a second command based on a communication protocol capable of handling the file system in communication with said recording or playback apparatus,
- wherein the communication protocol employed in determining the second command that the request is converted to is determined in accordance with handling the file system in a subsequent stage,
- wherein the second command accesses a real file system and a virtual file system of the recording or playback apparatus, and
- wherein the virtual file system comprises a communication function based on protocol that provides real files managed by the real file system as virtual files managed by the virtual file system to the exterior, and
- the virtual file system provides to the exterior, in the form of a single file, a virtual file comprising data from a plurality of different files managed by the real file system,
- wherein the virtual file provided to the exterior comprises audio and video files, and
- wherein back-up files, disk information files, clip information files, and frame metadata files, each of which are managed by the real file system, are filtered out and excluded from the virtual file provided to the exterior.

7. A computer-readable medium for storing executable program code for controlling a recording or playback apparatus having a file system to perform control of information, the program code comprising the steps of:
- receiving a first command provided by an operating system in response to a file operating request from an application; and
- converting the first command provided by the operating system into a request which is to be converted into a second command based on a communication protocol capable of handling the file system in communication with said recording or playback apparatus,
- wherein the communication protocol employed in determining the second command that the request is converted to is determined in accordance with handling the file system in a subsequent stage,
- wherein the second command accesses a real file system and a virtual file system of the recording or playback apparatus, and
- wherein the virtual file system comprises a communication function based on protocol that provides real files managed by the real file system as virtual files managed by the virtual file system to the exterior, and
- the virtual file system provides to the exterior, in the form of a single file, a virtual file comprising data from a plurality of different files managed by the real file system,
- wherein the virtual file provided to the exterior comprises audio and video files, and
- wherein back-up files, disk information files, clip information files, and frame metadata files, each of which are managed by the real file system, are filtered out and excluded from the virtual file provided to the exterior.

8. A recording medium containing a program for use with a computer connected to a recording or playback apparatus having a file system, the program comprising the steps of:
- receiving a first command provided by an operating system in response to a file operating request from an application; and
- converting the first command provided by the operating system into a request which is to be converted into a second command based on a communication protocol capable of handling the file system in communication with said recording or playback apparatus,
- wherein the communication protocol employed in determining the second command that the request is converted to is determined in accordance with handling the file system in a subsequent stage,
- wherein the second command accesses a real file system and a virtual file system of the recording or playback apparatus, and
- wherein the virtual file system comprises a communication function based on protocol that provides real files managed by the real file system as virtual files managed by the virtual file system to the exterior, and
- the virtual file system provides to the exterior, in the form of a single file, a virtual file comprising data from a plurality of different files managed by the real file system,
- wherein the virtual file provided to the exterior comprises audio and video files, and
- wherein back-up files, disk information files, clip information files, and frame metadata files, each of which are managed by the real file system, are filtered out and excluded from the virtual file provided to the exterior.

9. An information processing apparatus, including one or more hardware elements, connected to a recording or playback apparatus having a file system, the information processing apparatus comprising:
- a receiving unit for receiving a first command provided by an operating system in response to a file operating request from an application; and
- a converting unit for converting the first command provided by the operating system into a request which is to be converted into a second command based on a communication protocol capable of handling the file system in communication with said recording or playback apparatus,
- wherein the communication protocol employed in determining the second command that the request is converted to is determined in accordance with handling the file system in a subsequent stage,
- wherein the second command accesses a real file system and a virtual file system of the recording or playback apparatus, and
- wherein the virtual file system comprises a communication function based on protocol that provides real files managed by the real file system as virtual files managed by the virtual file system to the exterior, and
- the virtual file system provides to the exterior, in the form of a single file, a virtual file comprising data from a plurality of different files managed by the real file system,
- wherein the virtual file provided to the exterior comprises audio and video files, and
- wherein back-up files, disk information files, clip information files, and frame metadata files, each of which are managed by the real file system, are filtered out and excluded from the virtual file provided to the exterior.

* * * * *